United States Patent
Larson et al.

(10) Patent No.: US 11,866,669 B2
(45) Date of Patent: *Jan. 9, 2024

(54) HIGH PROTEIN ORGANIC MATERIALS AS FUEL AND PROCESSES FOR MAKING THE SAME

(71) Applicant: AKBEV GROUP, LLC, Juneau, AK (US)

(72) Inventors: Geoffrey L Larson, Juneau, AK (US); Curtis Holmes, Juneau, AK (US); Brandon Michael Smith, Chico, CA (US); David D. Wilson, Juneau, AK (US)

(73) Assignee: AKBEV GROUP, LLC, Juneau, AK (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/845,676

(22) Filed: Jun. 21, 2022

(65) Prior Publication Data
US 2022/0333028 A1 Oct. 20, 2022

Related U.S. Application Data

(63) Continuation-in-part of application No. 17/205,394, filed on Mar. 18, 2021, now Pat. No. 11,441,090, (Continued)

(51) Int. Cl.
*C10L 5/48* (2006.01)

(52) U.S. Cl.
CPC ......... *C10L 5/48* (2013.01); *C10L 2200/0461* (2013.01); *C10L 2250/06* (2013.01); (Continued)

(58) Field of Classification Search
CPC .............. C10L 5/48; C10L 2200/0461; C10L 2250/06; C10L 2290/02; C10L 2290/06; (Continued)

(56) References Cited

U.S. PATENT DOCUMENTS 2,494,544 A   1/1950  Erlich
4,290,269 A   9/1981  Hedstrom et al.
(Continued)

FOREIGN PATENT DOCUMENTS

EP   2136138      12/2009
JP   S54120423   9/1979
(Continued)

OTHER PUBLICATIONS

International Search Report for PCT Patent Application No. PCT/US2016/059528 dated Feb. 15, 2017 and Written Opinion for PCT Patent Application No. PCT/US2016/059528 dated Jun. 8, 2018.
(Continued)

*Primary Examiner* — Cephia D Toomer
(74) *Attorney, Agent, or Firm* — Emerson, Thomson & Bennett, LLC; Roger D. Emerson; Peter R. Detorre

(57) ABSTRACT

A process of making a fuel product from a non-combustible high protein organic material such as a biological by-product or waste material. The moisture content of the high protein organic material is mechanically reduced and dried to reduce the moisture content to less than ten percent (10%). The high protein organic material is pulverized to a particle size of less than about 2 mm. The high protein organic waste material is fed into a combustion chamber and separated during combustion such as by spraying high protein organic waste material within the combustion chamber. Temperature and combustion reactions within the combustion chamber are controlled by controlling the moisture in the combustion atmosphere and energy injections at or downstream of the combustion chamber. The concentration of protein thermal decomposition by-products, temperature, and residence time and/or additions of energy plasma within the combustion chamber environment are controlled to degrade hazardous polyfluoro compounds.

22 Claims, 4 Drawing Sheets

Related U.S. Application Data which is a continuation-in-part of application No. 16/345,151, filed as application No. PCT/US2017/030420 on May 1, 2017, now Pat. No. 10,982,162, which is a continuation-in-part of application No. 15/469,074, filed on Mar. 24, 2017, now Pat. No. 10,781,388, and a continuation-in-part of application No. PCT/US2016/059528, filed on Oct. 28, 2016, which is a continuation-in-part of application No. 14/756,904, filed on Oct. 28, 2015, now Pat. No. 10,364,400, said application No. 15/469,074 is a continuation-in-part of application No. 14/756,904, filed on Oct. 28, 2015, now Pat. No. 10,364,400, which is a continuation-in-part of application No. 13/199,505, filed on Sep. 1, 2011, now Pat. No. 9,447,354.

(52) U.S. Cl.
CPC ....... *C10L 2290/02* (2013.01); *C10L 2290/06* (2013.01); *C10L 2290/08* (2013.01); *C10L 2290/148* (2013.01); *C10L 2290/28* (2013.01); *C10L 2290/30* (2013.01); *C10L 2290/36* (2013.01); *C10L 2290/58* (2013.01)

(58) Field of Classification Search
CPC ........... C10L 2290/08; C10L 2290/148; C10L 2290/28; C10L 2290/30; C10L 2290/36; C10L 2290/58; C10L 1/20; C10L 1/221; C10L 1/14; C10L 2200/0469; C10L 2290/54; C10L 2290/60; C10L 5/46; C10L 5/42; F23G 5/085; F23G 5/12; F23G 2201/80; F23G 2204/201; F23G 2206/10; F23G 2209/142; F23G 2209/262; F23G 5/04; F23G 2201/20; F23G 2205/20; F23G 2206/203; F23G 2209/26; F23J 2219/201; Y02E 20/12; Y02E 50/30; Y02E 50/10; F23L 2900/07009

See application file for complete search history.

(56) References Cited

U.S. PATENT DOCUMENTS

| | | | |
|---|---|---|---|
| 4,464,402 | A | 8/1984 | Gannon |
| 5,536,650 | A | 7/1996 | Versteegh |
| 5,637,336 | A | 6/1997 | Kannenberg et al. |
| 6,167,636 | B1 | 1/2001 | Kepplinger et al. |
| 9,447,354 | B2 | 9/2016 | Larson et al. |
| 9,708,937 | B2 | 7/2017 | Janicki |
| 10,247,049 | B2 | 4/2019 | Janicki |
| 11,441,090 | B2 * | 9/2022 | Larson ...................... F23G 5/04 |
| 2005/0166811 | A1 | 8/2005 | Alexakis et al. |
| 2013/0055622 | A1 | 3/2013 | Larson et al. |
| 2013/0091761 | A1 | 4/2013 | Willner |
| 2013/0352854 | | 12/2014 | White et al. |
| 2014/0352854 | A1 | 12/2014 | White |

FOREIGN PATENT DOCUMENTS

| | | |
|---|---|---|
| JP | 2001241848 | 9/2001 |
| PT | 104494 | 3/2010 |
| WO | 9822751 | 5/1998 |
| WO | 2009049385 | 4/2009 |
| WO | 2010117288 | 10/2010 |

OTHER PUBLICATIONS

Written Opinion for PCT Patent Application No. PCT/US2017/030420 dated Sep. 18, 2017.
Sky News Article dated Feb. 1, 2010, Author Gerard Tubb, entitled "Heineken Forced to Can Green Power Plants", 2 pages, copyright 2011 BSKYB.
Wartsila Corp. Press Release Mar. 3, 2008, entitled "Wartsila Delivers Worlds First BioPower Plant Using Brewery Spent Grain", copyright 2010 Wartsila.
McCabe, John T. "The Practical Brewer", Amer. Assn. of Cereal Chemists; 3rd Edition (Apr. 1, 1999).
Trageser, Claire. "What do Craft Brewers Do With Some of Their Waste? Feed it to the Cows", published Apr. 9, 2018. https://www.kpbs.org/news/2018/apr/09/what-do-craft-brewers-do-some-their-waste-feed . . . .
Spengler, Jessica. "Using Spent Grain Responsibly". https://beverage-master.com/article/using-spent-grain-responsibly/ (Jan. 31, 2017).
Kurzrock, Dan. "What Usually Happens to Brewers' "Spent" Grain?" https://www.regrained.com/blogs/upcyclist/what-usually-happens-to-brewers-spent-grain (Jun. 13, 2017).
Fuller, Janet Rausa. "Boom in Breweries leads to Growing Problem: What to do With Spent Grain?" https://www.dnainfo.com/chicago/20141020/chicago/boom-breweries-leads-growing-pro . . . (Oct. 20, 2014).
Mitchell Dushay & Phil Lewis. "Business Study of Alternative Uses for Brewers' Spent Grain" Final Project Report. (Apr. 28, 2011).
Brewers Association Solid Waste Reduction Manual (Mar. 25, 2013).
Zebell, Lorenza, et al. "Spent Grain Creative Waste Solutions". (May 16, 2016).
Lynch, Kieran M., et al. "Brewers' Spent Grain: A Review with an Emphasis on Food and Health" https://onlinelibrary.wiley.com/doi/full/10.1002/jib.363 (Oct. 28, 2016).
Weger, Andreas, et al. "Solid Biofuel Production by Mechanical Pre-Treatment of Brewers' Spent Grain", The Italian Association of Chemical Engineering (Apr. 19, 2014).
Greer, Diane. "Feeding it Back", http://biomassmagazine.com/articles/1735/feeding-it-back (Jun. 20, 2008).
"Spent Grain Burns into Clean Energy" http://www.energy-enviro.com/demo47/index.php?PAGE=1863&PRINT=yes (Jun. 17, 2008).
Beharry, Lyndon Martin W. "MCS-APB Tiger Brewery Brewers Spent Grains Question" https://www.slideshare.net/LMBeharry/2015-0913-mcsapbspentgrains (Sep. 11, 2015).
Supplementary European Search Report, dated May 8, 2020 for European Application No. 17864641.0-1104/3532569.

* cited by examiner

HIGH PROTEIN ORGANIC MATERIALS AS FUEL AND PROCESSES FOR MAKING THE SAME

TECHNICAL FIELD

The present disclosure generally relates to organic materials that are problematic to burn because of their high protein content. Such materials include bio-solids from waste-water treatment plants; high protein fermentation waste and waste by-products; high protein waste and by-products from agricultural sources of oil production; and high protein meat production waste, high protein meat by-products, high protein biological waste by-products and high protein animal excreta. These potential fuels are too high in protein to allow for suitable combustion under typical conditions and to allow for regulatory compliant emission characteristics in combustion chambers such as those used to make Steam. While these high protein organic materials can burn they are unable to sustain unassisted auto combustion in air once ignited. These high protein organic materials are traditionally considered non-auto-combustible. While wood products and petroleum products can sustain unassisted auto combustion once ignited in air, these high protein organic materials will stop burning if additional fuel is not used to assist in their incineration. These high protein organic materials maybe able to be burnt (incinerated) however, they are not able to sustain an auto combustible state without additional traditional fuels being use (e.g., wood products, paper products, cardboard, high cellulosic biomass such as grass or hay or chaff etc., or hydrocarbons such as fuel oil, coal or natural gas). Accordingly, the present disclosure relates to a novel and improved process for making a combustible fuel product from a traditionally considered non-auto-combustible organic material that is high in protein. The present disclosure further relates to the novel use of high protein organic materials as a primary fuel source, or as a fuel additive, for a furnace, steam boiler, incinerator and other combustion applications and to a method of using protein thermal decomposition by-products to degrade hazardous compounds to less hazardous substances and/or extraordinarily stable compounds not normally degradable in conventional combustion operations.

BACKGROUND

Certain high protein organic materials are known for being problematic when used as a source of fuel. Such materials may be ignited, however, they have not been previously shown to auto-combust as previous attempts to use these high protein materials as a primary fuel for combustion results in incomplete combustion and/or the generation of a large amount of smoke which is outside of regulatory compliance limits, for example, exceeding 20% opacity averaged over 6 minutes (i.e., more than 20% of light is blocked by emissions over any 6-minute interval).

Consequently, the only way these high protein organic materials could be used for continued combustion over an extended period of time is when these materials constituted only a minor component of the total fuel used in the combustion chamber. Ultimately, traditionally high protein organic materials needed other traditional flammable materials (e.g., wood products, paper products, cardboard, high cellulosic biomass such as grass or hay or chaff etc., or hydrocarbons such as fuel oil, coal or natural gas) to constitute the majority of the fuel that is used for combustion. These high protein organic materials, however, present great potential for reducing operating costs of fuel operated systems, conserving use of other fuel sources and for disposing unwanted materials. Examples of high protein materials which have been traditionally problematic as alternative fuel sources include but are not limited to grains such as spent grain and distillers grains, hops residues, yeast residues, solid waste material from animals, bio-solids from waste-water treatment plants, high protein animal meat processing by-product (e.g., meat and bone meal, feathers, feather meal, animal excreta) and other high protein organic wastes and high protein organic by-products.

Spent grain from the brewing of alcoholic products has been used as a food product such as cattle feed. In some of the processes used to make the food product, it is known to reduce the moisture content of the spent grain through press and/or drying operations. Although there have been some attempts to use spent grain as a major part of the fuel used for a steam boiler, such attempts have been unsuccessful due to insufficient or failure of combustion and excessive smoke produced thereby. Although there have been some successful attempts to use spent grain as a minor part of the fuel for a steam boiler or combustion system, attempts to use spent grain as the sole or primary fuel have been unsuccessful due to insufficient or failure of combustion and excessive smoke produced thereby.

Similar problems have been shown to exist with respect to the use of bio-solid waste materials from waste-water treatment plants, animal solid waste, hops residues, oil seed pulp meal, high protein animal meat processing by-product (e.g., meat and bone meal, feathers, feather meal and animal excreta) and other high protein organic wastes as a primary fuel source. One feature that is common to these types of organic materials is that each of these materials contain a relatively large amount of protein and other compounds which cross link and agglomerate during combustion resulting in a relatively incomplete and inefficient combustion process. Therefore, what is needed is a process which can reduce the extent of the protein cross linking and other cross-linking reactions which result in the formation of larger agglomerated masses that occurs within these materials during combustion to render them suitable for use as an alternative fuel source.

Accordingly, the present disclosure provides a novel process for making a fuel product from a high protein organic material such as spent grain, distillers grains, hops residue, bio-solids from waste-water treatment plants, solid animal waste, oil seed pulp meal, high protein animal meat processing by-product (e.g., meat and bone meal, feather meal, animal excreta) and other high protein organic wastes or combinations thereof. The present disclosure also provides a novel and improved process for making such fuel products. The fuel products included herein can be used in a furnace, a steam boiler, an incinerator or other fireboxes in conformance with present day environmental and emission laws and regulations. The fuel products included herein can also be successfully used as the sole or primary fuel, or as a fuel additive or enhancement, for a steam boiler such as that used in the brewing process as well as other processes, drying operations, energy generation and other applications.

The present disclosure further provides a novel and improved process for making high protein organic materials as a fuel product using machines or devices that are commercially available in industry.

The present disclosure further provides heat for a brewing processes and other heat-required applications using a steam boiler fueled by novel high protein organic material as a fuel product made from the spent grain, distillers grains and hops residues by-products of the brewing industry.

The present disclosure also provides for fuel operated systems of various applications which incorporate the use of novel high protein organic materials as a fuel product made from bio-solids from a waste-water treatment plant.

The present disclosure also provides for fuel operated systems of various applications which incorporate the use of novel high protein organic materials as a fuel product made from oil seed pulp meal.

The present disclosure also provides for fuel operated systems of various applications which incorporate the use of novel high protein animal meat processing by-products (e.g., meat and bone meal, feather meal, animal excreta).

The present disclosure also provides for fuel operated systems of various applications which incorporate the use of novel fuel products made from any high protein organic materials.

The present disclosure also provides for a process for combusting a traditionally non-auto-combustible high protein organic material using the non-auto-combustible high protein organic material as the sole or primary source of fuel, that is, without the use of a traditional combustible fuel or additives to aid in combustion (which include for example wood products, paper products, cardboard, high cellulosic bio-mass such as grass or hay or chaff etc., or hydro carbons such as fuel oil, coal or natural gas).

In addition, many non-auto-combustible high protein organic fuels contain man-made toxic chemicals. These toxic chemicals are highly fluorinated and known as "forever chemicals" because they are nearly indestructible and last forever. "Forever chemicals" are used in manufacturing processes such as in the textile industries, in many consumer products such as nonstick cookware, food packaging, fire retardants and in industrial applications such as fire retardants used at air ports, military bases and municipal fire stations. They are also used in products such as sealant tape, floor wax, in machinery to reduce gear friction and to make clothing and other fabrics stain and water resistant. "Forever chemicals" ultimately find their way into the water system/eco-systems and are ingested by both humans and animals. As such, high protein solids from waste treatment plant are known for containing "forever chemicals." Accordingly, the present disclosure also provides a method of using protein thermal decomposition by-products to degrade extraordinarily stable hazardous compounds, such as PFAS to less hazardous substances and/or extraordinarily stable compounds not normally degradable in conventional combustion operations.

One advantage of the process for degrading extraordinarily stable hazardous compounds such as "Fluorinated-hydrocarbons" compounds including PFAS or highly fluorinated "forever chemicals" is that it allows for the use of lower temperatures of combustion to facilitate PFAS destruction. The Environmental Protection Agency (EPA) has very high temperature requirements for PFAS destruction. Lowering temperature of combustion for PFAS destruction provides three advantages, namely: 1) lower capital and maintenance cost of the combustion equipment (similar to conventional combustion equipment); 2) lower operating expenses (less fuel requirements); and 3) less resulting ash residue fusing or melting. With respect to point 3, many PFAS contaminated waste ashes will melt at the higher temperatures required by conventional combustion EPA specifications, which renders them unsuitable for use with existing combustion technology. As ash melts in the combustion chamber, it causes clinkering, or glass formation which corrupts operations in the combustion chamber and renders the typical higher temperature combustion method for PFAS destruction as unsuitable for low ash fusion (melting) temperature PFAS containing compounds. The process described herein provides a solution to this problem by lowering the temperature of PFAS or "forever chemical" destruction.

SUMMARY

Provided is a process for making a combustible fuel product, or an additive, from a non-auto-combustible organic material for a combustion system having a low nitrogen oxide (NOX) production and a low emissions opacity. The process includes the following steps in any order: providing a non-auto-combustible organic material, wherein the organic material is a high protein organic material having a protein content of about 10% (dry weight basis) or greater; optionally mechanically removing liquid and soluble components from the high protein organic material; optionally, applying heat to dry the organic material to reduce its moisture content to ten percent (10%) or less by weight; pulverizing the high protein organic material to reduce the high protein organic material to a particle size of less than 2 mm; separating particles of the high protein organic material during a combustion phase to inhibit their cohesion into an integrated mass by spraying the particles into a combustion chamber; optionally, controlling the moisture concentration in the combustion chamber by pre-drying the combustion air; simultaneously injecting steam into the combustion chamber to enhance combustion characteristics of the high protein organic material in a regulatory compliant manner; and, allowing protein thermal decomposition by-products to react with nitrogen oxides (NOX) within the combustion chamber to form water ($H_2O$) and nitrogen ($N_2$), wherein the nitrogen oxide (NOX) production ranges from about 100 parts per million (ppm) to about 150 parts per million (ppm) and wherein the opacity of the emissions is about 20% or less on average for every 6-minute interval. In further aspects of the present process, the nitrogen oxide (NOX) production is less than 150 parts per million (ppm) whereas in other aspects, the nitrogen (NOX) about 150 parts per million (ppm) or less. In further aspects of the present process, the nitrogen oxide (NOX) production is controlled to be much greater than 150 parts per million (ppm), for example over 300 ppm, whereas in other aspects, the nitrogen (NOX) can later in the combustion process be lowered to 150 parts per million (ppm) or less. In certain aspects of the present process, the opacity of the emissions is about 20% or less on average for every 6-minute interval and in further aspects of the present process, the opacity of the emissions is about 6% or less on average for every 6-minute interval.

According to one aspect of the process, pulverizing, pressing, applying heat to dry the high protein organic material particles, spraying particles into the combustion chamber and injecting steam into the combustion chamber degrades the proteins contained within the particles and denatures them by allowing nitrogen cross-linking and other cross-linking reactions to occur within the particles, allowing the particles to complete all of the cross-linking ability before the particles contact other particles.

According to another aspect of the process, cross-linking of the high protein organic material particles is prevented by prematurely initiating cross-linking reactions of the nitrogen bonds and other cross linking reactions while the particles are being agitated and wherein the high protein organic material particles no longer adhere to each other, thereby arresting the particles tendency to adhere to each other within the combustion chamber via nitrogen bond cross-linkage and other cross-linking reactions.

According to another aspect of the process, the step of separating the high protein organic material by spraying the processed high protein organic material into the combustion chamber is effected through use of a pneumatic stoker.

According to another aspect of the process, spraying the particles of the high protein organic material into the combustion chamber by the pneumatic stoker keeps the particles separated in the combustion chamber long enough to allow heat transfer provided by the combustion process to quickly dry and then degrade proteins present within the high protein organic material and to prevent nitrogen cross linking and other cross linking reactions between the particles that would have the particles adhere to each other.

According to another aspect of the process, the particles of the high protein organic material are separated and dispersed within the combustion chamber and ignited and burned while in suspension and separated from each other before they land and adhere to each other.

According to another aspect of the process, the non-auto-combustible high protein organic material is rendered combustible without the addition of other combustible fuels or additives.

According to another aspect of the process, protein thermal decomposition by-products include ammonia, nitrogenous hydrocarbons and nitrogen-based compounds and wherein injection of ammonia, nitrogenous hydrocarbons and nitrogen-based compounds into the combustion chamber is not required to lower NOX production.

According to another aspect of the process, the step of removing water, moisture and other soluble components from the biological waste material incorporates the use of flocking agents, centrifuges, filter beds and dewatering separators.

According to another aspect of the process, the high protein organic material is a biological waste or by-product material.

According to another aspect of the process, the biological waste or by-product material originates from waste-water treatment activated sludge waste. The process according to this aspect includes the following order of steps: 1) providing a biological waste material or by-product comprising a waste-water treatment activated sludge having a protein content of about 10% or greater, on a dry weight basis (DWB) or in some cases, greater than 20%, on a dry weight basis (DWB); 2) removing water, moisture and other soluble components from the biological waste material or by-product; 3) drying the biological waste material or by-product to reduce the moisture content to 10% or less by weight; 4) pulverizing the biological waste material to reduce the particle size to be less than 2 mm; and 5) separating particles of the biological waste material or by-product during the combustion phase to inhibit their cohesion into an integrated mass by spraying the particles into the combustion chamber and 6) simultaneously injecting steam into the combustion chamber, wherein steam is injected to modify and control combustion reactions by reacting with nitrogen within proteins to form intermediate nitrogenous-based protein thermal combustion products which help to maintain regulatory compliance of combustion emissions.

According to another aspect of the process, the step of removing of water from the biological waste material or by-product comprises application of heat.

According to another aspect of the process, the step of drying biological waste or by-product material comprises drying the biological waste material or by-product in a heated drier, a heated progressing filter belt or other suitable drier and wherein the step of pulverizing the biological waste material or by-product comprises subjecting the biological waste material or by-product to a mill.

According to another aspect of the process, the high protein biological waste material or by-product is pulverized prior to drying to ensure that the high protein biological waste material has a particle size less than 2 mm.

According to another aspect of the process, the high protein organic biological waste material is hops residue. The process according to this aspect includes the following steps in the following order: 1) extracting oils and other compounds from the ground hops utilizing mechanical separation techniques or CO2 extraction to obtain a high protein hops waste residue having a protein content of about 25 to about 30 weight percent, on a dry weight basis (DWB); 2) providing the hops waste residue 3) drying the hops waste residue; 4) grinding the hops waste residue into a powder by pulverizing the hops waste residue to ensure that particles of the hops waste residue have a particle size of less than 2 mm; 5) agitating the hops waste residue during a combustion phase to separate particles of the hops waste residue by spraying the particles into the combustion chamber to inhibit their cohesion into an integrated mass and 5) simultaneously injecting steam into the combustion chamber to enhance the combustibility of the high protein organic material.

According to another aspect of the process, the step of pulverizing the hops waste residue includes subjecting the hops residue to a mill and wherein the step of drying the hops waste residue comprises the application of heat.

According to another aspect of the process, the high protein organic material is a high protein waste or meal from an agricultural source of oil production, waste by-products and by-products from an oil seed pulp processing.

According to another aspect of the process, the biological waste material comprises an oil seed pulp waste residue. The process for making a combustible fuel product from oil seed pulp waste residue according to this aspect includes the following order of steps: 1) obtaining an extracted high protein oil seed pulp waste residue having a protein content of about 35%, on a dry weight basis, a moisture content of ten percent (10%) or less and a particle size less than 2 mm, wherein oil from the oil seed pulp waste residue may or may not be preliminarily extracted; and 2) separating and agitating particles of the oil seed pulp waste residue during the combustion phase to inhibit their cohesion into an integrated mass while simultaneously injecting steam into the combustion chamber.

According to another aspect of the process, the process includes the steps of drying and pulverizing the oil seed pulp waste residue to ensure a moisture content of ten percent (10%) or less and a particle size of less than 2 mm.

According to another aspect of the process, the high protein organic material is one of a high protein animal excreta or a high protein animal meat processing by-product or waste. The process according to this aspect includes the following steps: obtaining a pre-processed or "as is" high protein animal excreta or high protein animal meat processing by-product or waste which is non-auto-combustible, wherein the animal excreta has a protein content ranging from about 20% to about 60% (dry weight basis) and the animal meat processing by-product or waste has a protein content ranging from about 35% to about 85%, on a dry weight basis; removing liquid and soluble components from the high protein organic material; applying heat to dry the high protein organic material to reduce its moisture content to ten percent (10%) or less by weight; grinding the high protein organic material to reduce the high protein organic material to a particle size of less than 2 mm; separating particles of the high protein organic material during a combustion phase to inhibit their cohesion into an integrated mass by spraying the particles into a combustion chamber; simultaneously injecting steam into the combustion chamber to enhance combustion characteristics of the high protein organic material in a regulatory compliant manner; and, allowing protein thermal decomposition by-products to react with nitrogen oxides (NOX) within the combustion chamber to form water ($H_2O$) and nitrogen ($N_2$).

Also provided is a process for converting hazardous compounds to less hazardous substances. The process includes the following steps: 1) providing a non-auto-combustible organic material, wherein the organic material is a high protein organic material having a protein content of about 10%, on a dry weight basis (DWB) or greater; 2) optionally mechanically removing liquid and soluble components from the high protein organic material; 3) optionally applying heat to dry the organic material to reduce its moisture content to ten percent (10%) or less by weight; 4) pulverizing the high protein organic material to reduce the high protein organic material to a particle size of less than 2 mm, wherein the pre-combustion steps of 2) optionally mechanically removing liquid and soluble components from the high protein organic material, 3) optionally applying heat to dry the organic material to reduce its moisture content to ten percent (10%) or less by weight and, 4) pulverizing the high protein organic material to reduce the high protein organic material to a particle size of less than 2 mm, wherein the above mentioned pre-combustion steps may occur in any order; 5) separating particles of the high protein organic material during a combustion phase to inhibit their cohesion into an integrated mass by spraying the particles into a combustion chamber; 6) simultaneously injecting steam into the combustion chamber to enhance combustion characteristics of the high protein organic material; 7) allowing protein thermal decomposition by-products to react with nitrogen oxides (NOX) within the combustion chamber to form water ($H_2O$) and nitrogen ($N_2$); wherein nitrogen oxide (NOX) production ranges from about 100 parts per million (ppm) to about or greater than 300 parts per million (ppm); wherein protein thermal decomposition by-products remaining after combustion include ammonium, nitrogenous hydrocarbons, carbon monoxide (CO), carbon dioxide ($CO_2$), nitrogen oxides (NOX), nitrogen free radicals, nitrogen cations and other non-nitrogen containing free radical intermediate combustion reactants in the combustion gasses; 8) controlling protein thermal decomposition by-products including nitrogen oxide (NOX) production, produced during combustion within the combustion chamber; and 9) incinerating polyfluoro impurities present within the processed non-auto-combustible high protein organic material in the combustion chamber and/or adding and incinerating polyfluoro compounds within the combustion chamber, wherein the protein thermal decomposition by-products functions as a reactive species to incinerate polyfluoro compounds to degrade hazardous polyfluoro compounds into less hazardous substances.

According to another aspect of the process, protein decomposition by-products resulting from the combustion of high protein organic materials contains about 300 ppm or more ash, ammonium, nitrogenous hydrocarbons, carbon monoxide (CO), carbon dioxide ($CO_2$), nitrogen oxides (NOX), nitrogen free radicals, nitrogen cations and other non-nitrogen containing free radical intermediate combustion reactants.

According to another aspect of the process, pulverizing, pressing, applying heat to dry the high protein organic material particles, spraying particles into the combustion chamber and injecting steam into the combustion chamber degrades the proteins contained within the particles and denatures them by allowing nitrogen cross-linking and other cross-linking reactions to occur within the particles, allowing the particles to complete all of the cross-linking ability before the particles contact other particles.

According to another aspect of the process, cross-linking of the high protein organic material particles is prevented by prematurely initiating cross-linking reactions of the nitrogen bonds and other cross linking reactions while the particles are being agitated and wherein the high protein organic material particles no longer adhere to each other, thereby arresting the particles tendency to adhere to each other within the combustion chamber via nitrogen bond cross-linkage and other cross-linkage reactions.

According to another aspect of the process, the step of separating the high protein organic material by spraying the processed high protein organic material into the combustion chamber is effected through use of a pneumatic stoker.

According to another aspect of the process, spraying the particles of the high protein organic material into the combustion chamber by the pneumatic stoker keeps the particles separated in the combustion chamber long enough to allow heat transfer provided by the combustion process to quickly dry and then degrade proteins present within the high protein organic material and to prevent nitrogen cross linking and other cross linking reactions between the particles that would have the particles adhere to each other.

According to another aspect of the process, the particles of the high protein organic material are separated and dispersed within the combustion chamber and ignited and burned while in suspension and separated from each other before they land and adhere to each other.

According to another aspect of the process, the non-auto-combustible high protein organic material is rendered combustible without the addition of other combustible fuels or additives.

According to another aspect of the process, the polyfluoro compound impurities and polyfluoro compounds comprise polyfluoroalkyl compounds and perfluoralkyl compounds (PFAS), organic fluoride (organo fluorine) compounds and non-organic mineralized organo fluorine compounds.

According to another aspect of the process, the PFAS substances further comprise perfluorooctanoic acid (PFOA) and perfluorooctane sulfonate (PFOS). Examples of polyfluoro compounds including PFAS, PFOA and PFOS used as reactants within the combustion chamber of the process described herein are provided in Table I below.

According to another aspect of the process, the process includes controlling the concentration of ammonium, nitrogenous hydrocarbons, carbon monoxide (CO), carbon dioxide ($CO_2$), nitrogen oxides (NOX), nitrogen cations, nitrogen free radicals and other non-nitrogen containing free radical intermediate combustion reactants in the combustion gasses within the combustion chamber.

According to another aspect of the process, the concentration of protein thermal decomposition by-products and excess water within the combustion chamber is controlled to react and convert carbon-fluoride bonds in PFAS compounds to nitrogen, carbon dioxide/carbon monoxide, hydrogen fluoride (HF) and various inorganic fluoride containing salts and/or minerals based upon cations present in the fuel.

According to another aspect of the process, the incineration of PFAS compounds within the combustion chamber occurs at a temperature of 999° C. or below.

According to another aspect of the process, the incineration of PFAS compounds within the combustion chamber has a residence time of 1 second or less at a temperature of 999° C.

According to another aspect of the process, the nitrogen cations and concentrations of nitrogen cations present within the combustion chamber after combustion of the high protein organic material vary upon the type of high protein fuel used for combustion and ash resulting from the combustion process.

According to another aspect of the process, the ash comprises one or more of calcium, sodium, potassium, phosphorus, silica, and manganese.

According to another aspect of the process, the PFAS substances are degraded to an inorganic mineralized form.

According to another aspect of the process, the PFAS substances are degraded to one or more of calcium fluoride ($CaF_2$), hydrogen fluoride (HF), silicon tetrafluoride ($SiF_4$) aluminum fluoride $AlF_3$ titanium (III) trifluoride ($TiF_3$), titanium (IV) tetrafluoride ($TiF_4$), iron (III) fluoride ($FeF_3$), magnesium fluoride ($MgF_2$), potassium fluoride (KF), sodium fluoride (NaF) sulfur hexafluoride ($SiF_6$), sulfur decafluoride ($S_2F_{10}$), sulfur tetrafluoride ($SF_4$), sulfur difluoride ($SF_2$), disulfur difluoride ($S_2F_2$), disulfur tetrafluoride ($S_2F_4$), phosphorus trifluoride ($PF_3$), phosphorus pentafluoride ($PF_5$), diphosphorus tetrafluoride ($P_2F_4$), strontium (II) fluoride ($SrF_2$), barium fluoride ($BaF_2$), manganese (II) fluoride ($MnF_2$), manganese (III) fluoride ($MnF_3$), manganese (IV) fluoride ($MnF_4$), fluorapatite ($Ca_5FO_{12}P_3$), acuminite ($SrAlF_4(OH)\cdot(H_2O)$), artroeite ($PbAlF_3(OH)_2$), baraite (ammonium fluorosilicate) $(NH_4)_2SiF_6$, bultfonteinite ($Ca_2SiO_2)F_4$, creedite ($Ca_2SiO_2F_4$), cryolite ($Na_3AlF_6$), fluorocaphite (Ca, Sr, Ce, Na)$_5$(PO$_4$)$_3$F, kogarkoite ($Na_3SO_4F$), neighborite ($NaMgF_3$), sonolite ($Mn_9(SiO_4)_4F_2$, thomsenolite ($NaCaAlF_6\cdot H_2O$), Wagnerite (Mg, Fe)$_2PO_4F$), zharchikhite ($AlF(OH)_2$, zinc fluoride ($ZnF_2$), beryllium fluoride ($BeF_2$), lithium fluoride (LiF), rubidium fluoride (RbF), cesium fluoride (CsF), radium fluoride ($RaF_2$), zirconium (IV) fluoride ($ZrF_4$) mercury (II) fluoride ($HgF_2$), silver (I) fluoride (AgF), copper (II) fluoride ($CuF_2$), nickel (II) fluoride ($NiF_2$), chromium (II) fluoride ($CrF_2$), chromium (III) fluoride ($CrF_3$), cobalt (II) fluoride ($CoF_2$), vanadium (III) fluoride ($VF_3$), vanadium (IV) fluoride ($VF_4$), scandium (III) fluoride ($ScF_3$), boron trifluoride ($BF_3$), gallium (III) fluoride ($GaF_3$), platinum tetrafluoride ($PtF_4$), cadmium fluoride ($CdF_2$), molybdenum (IV) fluoride ($MoF_4$), molybdenum (V) fluoride ($MoF_5$), molybdenum (III) fluoride ($MoF_3$), tantalum (V) fluoride ($TaF_5$), palladium (II) fluoride ($PdF_2$), palladium (II, IV) fluoride ($PdF_3$), gold (III) fluoride ($AuF_3$), tin (II) fluoride ($SnF_2$), tin (IV) fluoride ($SnF_4$), lead tetrafluoride ($PbF_4$), bismuth (III) fluoride ($BiF_3$), and cerium (III) trifluoride ($CeF_3$).

According to another aspect of the process, the high protein organic material is a biological waste or by-product material, wherein the biological waste or by-product material originates from waste-water treatment activated sludge waste and wherein the process comprises the following order of steps: 1) providing a biological waste material or by-product comprising a waste-water treatment activated sludge having a protein content of about 10% or greater, on a dry weight basis (DWB); 2) removing water, moisture and other soluble components from the biological waste material or by-product; 3) drying the biological waste material or by-product to reduce the moisture content to 10% or less by weight; 4) pulverizing the biological waste material to reduce the particle size to be less than 2 mm; 5) separating particles of the biological waste material or by-product during the combustion phase to inhibit their cohesion into an integrated mass by spraying the particles into the combustion chamber; 6) simultaneously injecting steam into the combustion chamber, wherein steam is injected to modify and control combustion reactions by reacting with nitrogen within proteins to form intermediate nitrogenous-based protein thermal combustion products which help to maintain regulatory compliance of combustion emissions; 7) controlling protein thermal decomposition by-products including nitrogen oxide (NOX) production, produced during combustion within the combustion chamber, wherein the protein thermal decomposition by-products functions as a reactive species to incinerate PFAS, organic fluoride (organo fluorine) compounds and non-organic mineralized fluorine compounds; 8) optionally, adding additional PFAS substances in the combustion chamber for further combustion; and 9) incinerating PFAS, organic fluoride (organo fluorine) compounds and non-organic mineralized fluorine compounds within the combustion chamber, wherein the biological waste or by-product material contains PFAS, organic fluoride (organo fluorine) compounds and/or non-organic mineralized fluorine compounds and/or wherein PFAS, organic fluoride (organo fluorine) compounds and/or non-organic mineralized fluorine compounds are added to the biological waste or by-product material within the combustion chamber for incineration.

According to another aspect of the process, the high protein organic material is hops residue and wherein the process includes the following steps in the following order: 1) extracting oils and other compounds from the ground hops utilizing mechanical separation techniques or CO2 extraction to obtain a high protein hops waste residue having a protein content of about 25 to about 30 weight percent, on a dry weight basis (DWB); 2) providing the hops waste residue; 3) drying the hops waste residue, wherein the step of drying the hops waste residue comprises the application of heat; 4) grinding the hops waste residue into a powder by pulverizing the hops waste residue to ensure that particles of the hops waste residue have a particle size of less than 2 mm, wherein the step of pulverizing the hops waste residue includes subjecting the hops residue to a mill; 5) agitating the hops waste residue during a combustion phase to separate particles of the hops waste residue by spraying the particles into the combustion chamber to inhibit their cohesion into an integrated mass; 6) simultaneously injecting steam into the combustion chamber to enhance the combustibility of the high protein organic material; 7) controlling protein thermal decomposition by-products, including nitrogen oxide (NOX) production, produced during combustion within the combustion chamber, wherein the protein thermal decomposition by-products functions as a reactive species to incinerate PFAS, organic fluoride (organo fluorine) compounds and non-organic mineralized fluorine compounds; 8) optionally, adding additional PFAS substances in the combustion chamber for further combustion; and 9) incinerating PFAS, organic fluoride (organo fluorine) compounds and non-organic mineralized fluorine compounds within the combustion chamber, wherein the biological waste or by-product material contains PFAS, organic fluoride (organo fluorine) compounds and/or non-organic mineralized fluorine compounds and/or wherein PFAS, organic fluoride (organo fluorine) compounds and/or non-organic mineralized fluorine compounds are added to the biological waste or by-product material within the combustion chamber for incineration.

According to another aspect of the process, the high protein organic material is a high protein waste or meal from an agricultural source of oil production, waste by-products and by-products from an oil seed pulp processing.

According to another aspect of the process, the high protein organic material is an oil seed pulp waste residue, wherein the process includes the following order of steps: 1) obtaining an extracted high protein oil seed pulp waste residue having a protein content of about 35%, on a dry weight basis (DWB), a moisture content of ten percent (10%) or less and a particle size less than 2 mm, wherein oil from the oil seed pulp waste residue may or may not be preliminarily extracted; 2) separating and agitating particles of the oil seed pulp waste residue during the combustion phase to inhibit their cohesion into an integrated mass while simultaneously injecting steam into the combustion chamber; 3) controlling protein thermal decomposition by-products including nitrogen oxide (NOX) production, produced during combustion within the combustion chamber, wherein the protein thermal decomposition by-products functions as a reactive species to incinerate PFAS, organic fluoride (organo fluorine) compounds and non-organic mineralized fluoride compounds; 4) optionally, adding additional PFAS, organic fluoride (organo fluorine) compounds and non-organic mineralized fluorine compounds in the combustion chamber for further combustion; and 5) incinerating PFAS, organic fluoride (organo fluorine) compounds and non-organic mineralized fluorine compounds within the combustion chamber, wherein the oil seed pulp waste residue contains PFAS, organic fluoride (organo fluorine) compounds and/or non-organic mineralized fluorine compounds.

According to another aspect of the process, the high protein organic material is one of a high protein animal excreta or a high protein animal meat processing by-product or waste and wherein the process includes obtaining a pre-processed or "as is" high protein animal excreta or high protein animal meat processing by-product or waste which is non-auto-combustible, wherein the animal excreta has a protein content ranging from about 20% to about 60%, on a dry weight basis (DWB) and the animal meat processing by-product or waste has a protein content ranging from about 35% to about 85% dry weight basis.

Also provided is a process for converting hazardous compounds to less hazardous substances within a traditional combustion chamber. Traditional combustion chambers include any combustion chamber having a fuel intake, an exhaust, and an ignition source known to those of ordinary skill in the art. Traditional combustion chambers include conventional chambers used in various industries including but not limited to combustions chambers used to provide heat for various industrial processes and combustion chambers used for external and internal combustion engines. The process includes the following steps: 1) providing an auto-combustible organic fuel; 2) providing a non-auto-combustible organic material, wherein the organic material is a high protein organic material having a protein content of about 10%, on a dry weight basis (DWB) or greater; 3) optionally mechanically removing liquid and soluble components from the high protein organic material; 4) optionally applying heat to dry the organic material to reduce its moisture content to ten percent (10%) or less by weight; 5) pulverizing the high protein organic material to reduce the high protein organic material to a particle size of less than 2 mm, wherein the pre-combustion steps of 3) optionally mechanically removing liquid and soluble components from the high protein organic material, 4) optionally applying heat to dry the organic material to reduce its moisture content to ten percent (10%) or less by weight and, 5) pulverizing the high protein organic material to reduce the high protein organic material to a particle size of less than 2 mm may occur in any order; 6) injecting the auto-combustible organic material into a combustion chamber; 7) spraying the non-auto-combustible high protein organic material into the combustion chamber through use of a pneumatic stoker to separate particles of the high protein organic material and inhibit their cohesion into an integrated mass during combustion; 8) simultaneously injecting steam into the combustion chamber to enhance combustion characteristics of the high protein organic material; 9) allowing protein thermal decomposition by-products to react with nitrogen oxides (NOX) within the combustion chamber to form water ($H_2O$) and nitrogen ($N_2$), wherein nitrogen oxide (NOX) production ranges from about 100 parts per million (ppm) to greater than 300 parts per million (ppm) (or alternatively from about 100 parts per million (ppm) to about 150 parts per million (ppm)), wherein protein thermal decomposition by-products remaining after combustion include ammonium, nitrogenous hydrocarbons, carbon monoxide (CO), carbon dioxide ($CO_2$), nitrogen oxides (NOX), nitrogen free radicals, nitrogen cations and other non-nitrogen containing free radical intermediate combustion reactants in the combustion gasses; 10) controlling protein thermal decomposition by-products including nitrogen oxide (NOX) production, produced during combustion within the combustion chamber; and 11) incinerating polyfluoro compound impurities present within the processed non-auto-combustible high protein organic material in the combustion chamber and adding and incinerating additional polyfluoro compounds within the combustion chamber as an additional or alternative step, wherein the protein thermal decomposition by-products functions as a reactive species to incinerate polyfluoro compounds to degrade hazardous polyfluoro compounds into less hazardous substances.

Also provided is a process for converting hazardous polyfluoro compounds to less hazardous substances. The process includes the following steps: Pre-Combustion Steps 1) providing a non-auto-combustible organic material, wherein the organic material is a high protein organic material having a protein content of about 10% to about 20%, on a dry weight basis (DWB) or greater; 2) mechanically removing liquid and soluble components from the high protein organic material and combustion targeted components; 3) applying heat to dry the organic material and combustion targeted components to reduce its moisture content to ten percent (10%) or less by weight; 4) pulverizing the high protein organic material to obtain a reduced particle size of the high protein organic material, wherein the pre-combustion steps of 2) mechanically removing liquid and soluble components from the high protein organic material and combustion components, 3) applying heat to dry the organic material and combustion components to reduce its moisture content to ten percent (10%) or less by weight and, 4) pulverizing the high protein organic material to reduce the high protein organic material to a particle size of less than 2 mm may occur in any order; 5) separating particles of the high protein organic material during a combustion phase to inhibit their cohesion into an integrated mass by spraying the particles into a combustion chamber; 6) optionally, drying combustion air and injecting dehydrated combustion air having a moisture content of less than 1,000 parts per million (ppm) into a first zone of the combustion chamber; 7) injecting steam in a controlled manner into a second zone of the combustion chamber to enhance combustion characteristics of the high protein organic material; 8) allowing protein thermal decomposition by-products to react with nitrogen oxides (NOX) within the combustion chamber to form water ($H_2O$) and nitrogen ($N_2$); wherein aggregate nitrogen oxide (NOX) production ranges from about 100 parts per million (ppm) to about 350 parts per million (ppm); wherein protein thermal decomposition by-products remaining after or during combustion include ammonium, nitrogenous hydrocarbons, sulfur oxides (SOX), carbon monoxide (CO), hydrogen ions (H+), hydroxide ions (OH$^-$), ozone ($O_3$), carbon dioxide ($CO_2$), nitrogen oxides (NOX), nitrogen free radicals, nitrogen cations, nitrogen anions, oxygen free radicals, hydrogen free radicals, carbon free radicals, silicone free radicals, sulfur free radicals, phosphorous free radicals, metal free radicals including metal cations, wherein the metal cations are included in Table 2, in the combustion gasses; 9) controlling protein thermal decomposition by-products produced during combustion within the combustion chamber including nitrogen oxide (NOX) production, sulfur oxide (SOX) production, hydrogen ion (H+) production, hydroxide ion (OH$^-$) production, ozone ($O_3$) production, nitrogen free radicals, nitrogen cations, nitrogen anions, oxygen free radicals, hydrogen free radicals, carbon free radicals, silicone free radicals, sulfur free radicals, phosphorous free radicals, metal free radicals including metal cations, wherein the metal cations are included in Table 2, and carbon monoxide (CO) production by controlling the moisture in the combustion chamber by using any or all of steps (2), (3), (6) and (7); 10) combusting the processed non-auto-combustible high protein organic material and incinerating polyfluoro compound impurities present within the processed non-auto-combustible high protein organic material in the combustion chamber at a temperature of less than 1,400° C. and/or adding polyfluoro compounds as an additive to a traditional fuel within the combustion chamber to be incinerated with the combustion of non-auto-combustible high protein organic material at a temperature of less than 1,400° C., wherein the protein thermal decomposition by-products functions as a reactive species to incinerate polyfluoro compounds to degrade hazardous polyfluoro compounds into less hazardous substances.

According to another aspect of the process, the step of applying heat to dry the organic material and combustion targeted components reduces the moisture content of the organic material and combustion targeted components to five percent (5%) or less by weight.

According to another aspect of the process, the step of pulverizing the high protein organic material reduces the size of the high protein organic material to a particle size of 2 mm or less.

According to another aspect of the process, the step of combusting the processed non-auto-combustible high protein organic material and incinerating polyfluoro compound impurities present within the processed non-auto-combustible high protein organic material in the combustion chamber at a temperature of about 1,000° C. or less and/or adding polyfluoro compounds within the combustion chamber to be incinerated with the combustion of non-auto-combustible high protein organic material at a temperature of about 1,000° C. or less.

According to another aspect of the process, the combustion air is dehydrated with desiccants or refrigerated driers prior to introduction into the combustion chamber.

According to another aspect of the process, the process includes the step of introducing high energy ultra-violet light into a combustion gas mixture to initiate free radical development in the combustion gas mixture. According to a further aspect of the process, high energy ultra-violet light is introduced into the combustion gas mixture either directly into the combustion gas chamber or downstream from the combustion gas chamber after the combustion gas mixture has cooled to initiate free radical development in the combustion gas mixture.

According to another aspect of the process, the process includes the step of introducing high energy ultra-violet light into the combustion gas mixture either directly into the combustion gas chamber or downstream from the combustion gas chamber after the combustion gas mixture has cooled to initiate free radical development in the combustion gas mixture. According to a further aspect of the process, the process includes the step of introducing high energy ultra-violet light either directly into the combustion chamber or downstream from the combustion chamber in the exhaust gases to initiate free radical development in the lower temperature zones of a steam boiler operation.

According to another aspect of the process, the high energy ultra-violet light is introduced through industrial lamps and quartz lenses.

According to another aspect of the process, the process includes the step of introducing microwaves, radio frequencies and plasma energy into the combustion gas mixture. According to a further aspect of the process, microwaves, radio frequencies and plasma energy may be introduced either directly into the combustion gas chamber or downstream from the combustion gas chamber after the combustion gas mixture has cooled. For example, the microwaves, radio frequencies and plasma energy may be introduced in the combustion gas downstream from a steam boiler where combustion gas (now an exhaust gas) has cooled.

According to another aspect of the process, the process includes introducing microwaves, radio frequencies and plasma energy downstream from the combustion chamber in the exhaust gases to initiate free radical development in the lower temperature zones before or after of the steam boiler operations.

According to another aspect of the process, protein decomposition by-product exhaust gas resulting from the combustion of high protein organic materials contains nitrogen oxide (NOX), sulfur oxide (SOX), carbon monoxide (CO), carbon dioxide ($CO_2$), hydrogen ions (H+), hydroxide ions (OH$^-$), ozone ($O_3$), nitrogen free radicals, nitrogen cations, nitrogen anions, and other non-nitrogen containing free radical intermediate combustion reactants, wherein the protein decomposition by-product exhaust gas resulting from the combustion of high protein organic materials contains about 100 to about 350 ppm or more nitrogen oxides, wherein the protein decomposition by-product exhaust gas resulting from the combustion of high protein organic materials contains from 0 to about 25 ppm sulfur oxides, contains from about 10 to about 100 ppm carbon monoxide and wherein the protein decomposition by-product exhaust gas and ash resulting from the combustion of high protein organic materials also contain mineral cations that react with fluorine.

According to another aspect of the process, the steps of pulverizing, pressing, applying heat to dry the high protein organic material particles, spraying particles into the combustion chamber and injecting steam into the combustion chamber degrades the proteins contained within the particles and denatures them by allowing nitrogen cross-linking and other cross-linking reactions to occur within the particles, allowing the particles to complete all of the cross-linking ability before the particles contact other particles.

According to another aspect of the process, cross-linking of the high protein organic material particles is prevented by prematurely initiating cross-linking reactions of the nitrogen bonds and other cross linking reactions while the particles are being agitated and wherein the high protein organic material particles no longer adhere to each other, thereby arresting the particles tendency to adhere to each other within the combustion chamber via nitrogen bond cross-linkage and other cross-linkage reactions.

According to another aspect of the process, the step of separating the high protein organic material by spraying the processed high protein organic material into the combustion chamber is effected through use of a pneumatic stoker.

According to another aspect of the process, the step of spraying the particles of the high protein organic material into the combustion chamber by the pneumatic stoker keeps the particles separated in the combustion chamber long enough to allow heat transfer provided by the combustion process to quickly dry and then degrade proteins present within the high protein organic material and to prevent nitrogen cross linking and other cross linking reactions between the particles that would have the particles adhere to each other, wherein the particles of the high protein organic material are separated and dispersed within the combustion chamber and ignited and burned while in suspension and separated from each other before they land and adhere to each other.

According to another aspect of the process, polyfluoro compound impurities and polyfluoro compounds comprise polyfluoroalkyl and perfluoralkyl substances (PFAS), and organic fluoride (organo fluorine) compounds, wherein the PFAS substances further comprise perfluorooctanoic acid (PFOA) and perfluorooctane sulfonate (PFOS).

According to another aspect of the process, the process comprises controlling the concentration of ammonium, nitrogenous hydrocarbons, carbon monoxide (CO), carbon dioxide ($CO_2$), nitrogen oxides (NOX), sulfur oxides (SOX), hydrogen ions (H+), hydroxide ions ($OH^-$), ozone ($O_3$), nitrogen cations, nitrogen anions, nitrogen free radicals, oxygen free radicals, hydrogen free radicals, carbon free radicals, silicone free radicals, sulfur free radicals, phosphorous free radicals, metal free radicals whose metal cations comprise at least one of calcium, sodium, potassium, phosphorus, silica, manganese, aluminum, titanium, iron, magnesium, sulfur, strontium, ammonium, lithium, rubidium, cesium, radium, zirconium, mercury, silver, copper, nickel, chromium, cobalt, vanadium, scandium, boron, gallium, platinum, cadmium, molybdenum, tantalum, palladium, gold, tin, lead, bismuth, cerium, beryllium, and barium in the combustion gasses within the combustion chamber, wherein the concentration of protein thermal decomposition by-products and excess water or moisture within the combustion chamber is controlled to react and convert carbon-fluoride bonds in PFAS compounds to carbon dioxide/carbon monoxide, hydrogen fluoride (HF) and various inorganic fluoride containing salts and/or minerals based upon cations present in the fuel.

According to another aspect of the process, the incineration of PFAS compounds within the combustion chamber has a residence time of 1 second or less at a temperature below 1,400° C. and at a temperature of about 1,000° C. or less.

According to another aspect of the process, mineral cations and concentrations of mineral cations present within the combustion chamber after combustion of the high protein organic material vary upon the type of high protein fuel used for combustion and comprise at least one of calcium, sodium, potassium, phosphorus, silica, manganese, aluminum, titanium, iron, magnesium, sulfur, strontium, ammonium, lithium, rubidium, cesium, radium, zirconium, mercury, silver, copper, nickel, chromium, cobalt, vanadium, scandium, boron, gallium, platinum, cadmium, molybdenum, tantalum, palladium, gold, tin, lead, bismuth, cerium, beryllium, and barium.

According to another aspect of the process, reactions of PFAS with the nitrogen oxides and other free radicals and the mineral cations present within the combustion chamber after combustion of the high protein organic material vary upon the type of PFAS, high protein fuel used for combustion and the types of cations present in the ash.

According to another aspect of the process, PFAS substances are degraded to an inorganic mineralized form.

According to another aspect of the process, PFAS substances are degraded to calcium fluoride ($CaF_2$) or hydrogen fluoride (HF), silicon tetrafluoride ($SiF_4$), aluminum fluoride ($AlF_3$) titanium (III) trifluoride ($TiF_3$), titanium (IV) tetrafluoride ($TiF_4$), iron (III) fluoride ($FeF_3$), magnesium fluoride ($MgF_2$), potassium fluoride (KF), sodium fluoride (NaF) sulfur hexafluoride ($SiF_6$), sulfur decafluoride ($S_2F_{10}$), sulfur tetrafluoride ($SF_4$), sulfur difluoride ($SF_2$), disulfur difluoride ($S_2F_2$), disulfur tetrafluoride ($S_2F_4$), phosphorus trifluoride ($PF_3$), phosphorus pentafluoride ($PF_5$), diphosphorus tetrafluoride ($P_2F_4$), strontium (II) fluoride ($SrF_2$), barium fluoride ($BaF_2$), manganese (II) fluoride ($MnF_2$), manganese (III) fluoride ($MnF_3$), manganese (IV) fluoride ($MnF_4$), fluorapatite ($Ca_5FO_{12}P_3$), acuminite ($SrAlF_4(OH)\cdot(H_2O)$), artroeite ($PbAlF_3(OH)_2$), baraite (ammonium fluorosilicate) $(NH_4)_2SiF_6$, bultfonteinite $(Ca_2SiO_2)F_4$, creedite ($Ca_2SiO_2F_4$), cryolite ($Na_3AlF_6$), fluorocaphite $(Ca, Sr, Ce, Na)_5(PO_4)_3F$, kogarkoite ($Na_3SO_4F$), neighborite ($NaMgF_3$), sonolite ($Mn_9(SiO_4)_4F_2$, thomsenolite ($NaCaAlF_6\cdot H_2O$), Wagnerite ($(Mg, Fe)_2PO_4F$), zharchikhite ($AlF(OH)_2$, zinc fluoride ($ZnF_2$), beryllium fluoride ($BeF_2$), lithium fluoride (LiF), rubidium fluoride (RbF), cesium fluoride (CsF), radium fluoride ($RaF_2$), zirconium (IV) fluoride ($ZrF_4$) mercury (II) fluoride ($HgF_2$), silver (I) fluoride (AgF), copper (II) fluoride ($CuF_2$), nickel (II) fluoride ($NiF_2$), chromium (II) fluoride ($CrF_2$), chromium (III) fluoride ($CrF_3$), cobalt (II) fluoride ($CoF_2$), vanadium (III) fluoride ($VF_3$), vanadium (IV) fluoride ($VF_4$), scandium (III) fluoride ($ScF_3$), boron trifluoride ($BF_3$), gallium (III) fluoride ($GaF_3$), platinum tetrafluoride ($PtF_4$), cadmium fluoride ($CdF_2$), molybdenum (IV) fluoride ($MoF_4$), molybdenum (V) fluoride ($MoF_5$), molybdenum (III) fluoride ($MoF_3$), tantalum (V) fluoride ($TaF_5$), palladium (II) fluoride ($PdF_2$), palladium (II, IV) fluoride ($PdF_3$), gold (III) fluoride ($AuF_3$), tin (II) fluoride ($SnF_2$), tin (IV) fluoride ($SnF_4$), lead tetrafluoride ($PbF_4$), bismuth (III) fluoride ($BiF_3$), and cerium (III) trifluoride ($CeF_3$).

According to another aspect of the process, the high protein organic material is one or more of the following: a biological waste or by-product material, wherein the biological waste or by-product material originates from wastewater treatment activated sludge waste; hops residue; a high protein waste or meal from an agricultural source of oil production, waste by-products and by-products from an oil seed pulp processing and a high protein animal excreta or a high protein animal meat processing by-product or waste and wherein the process comprises obtaining a pre-processed or "as is" high protein animal excreta or high protein animal meat processing by-product or waste which is nonauto-combustible, wherein the animal excreta has a protein content ranging from about 10% to about 60%, on a dry weight basis (DWB) and the animal meat processing by-product or waste has a protein content ranging from about 20% to about 85% dry weight basis.

According to another aspect of the process, the protein content of the non-auto-combustible organic material ranges from about 20% to about 30% and the aggregate nitrogen oxide (NOX) production in the combustion chamber ranges from about 350 parts per million (ppm) to about 600 parts per million (ppm), the protein content of the non-auto-combustible organic material ranges from about 30% to about 60% and the aggregate nitrogen oxide (NOX) production in the combustion chamber ranges from about 600 parts per million (ppm) to about 1,000 parts per million (ppm), or the protein content of the non-auto-combustible organic material ranges from about 60% to about 80% and the aggregate nitrogen oxide (NOX) production in the combustion chamber ranges from about 1,000 parts per million (ppm) to about 1,400 parts per million (ppm).

According to another aspect of the process, the process occurs in a traditional combustion chamber.

BRIEF DESCRIPTION OF THE DRAWINGS

Other objects and advantages of the present disclosure will become apparent from the following detailed description taken in conjunction within the attached drawings, as shown within FIGS. 1-4, which include three schematic flow diagrams of various processes of the present disclosure.

DETAILED DESCRIPTION

The present disclosure provides a novel fuel product made from a high protein non-auto-combustible organic material. Examples of non-auto-combustible organic materials which may be used as a fuel source include spent grain, hops residues, solid animal waste, biological waste materials including bio-solid waste originating from waste-water treatment plant bio-solid sludge waste, oil seed pulp meal, distillers grains, feather meal (a by-product of the poultry industry), high protein animal meat processing by-product (e.g., meat and bone meal, feathers, feather meal, and animal excreta) and other high protein organic materials as a fuel sources that are processed to change its composition, structure, handling and combustion environment in order to sufficiently increase its combustibility. In certain aspects of the process, these changes in composition, structure, handling, and combustion environment allow the high protein non-auto-combustible waste material to be used as a primary or sole fuel product in accordance with air quality standards and other environmental regulations and law.

The high protein waste materials mentioned above may be categorized into the following four general types of waste materials: 1) bio-solids from waste-water treatment plants (containing from 10% protein to 30% protein on a dry weight basis); 2) high protein fermentation waste and waste by-products (examples include but are not limited to spent grain, hop residue, yeast and protein precipitates) (containing from 20% protein to 50% protein on a dry weight basis); 3) high protein waste and by-products from agricultural sources of oil production and seed processing, waste by-products and by-products (examples include but are not limited to sources of oil seed pulp meal (also called seed meal) including cotton seed pulp (or cotton seed meal), sunflower seed pulp (or sunflower meal), soybean pulp and hulls, olive pulp, coconut pulp, cotton seed, canola oil, vegetable oil in general, wheat middlings, corn gluten mill feed, hominy feed and combinations thereof) (containing from 30% protein to 50% protein on a dry weight basis); and 4) high protein animal meat processing by-product (examples include but are not limited to meat and bone meal, feathers, feather meal and animal excreta) (containing from 35% protein to over 80% protein on a dry weight basis).

Figure 1:
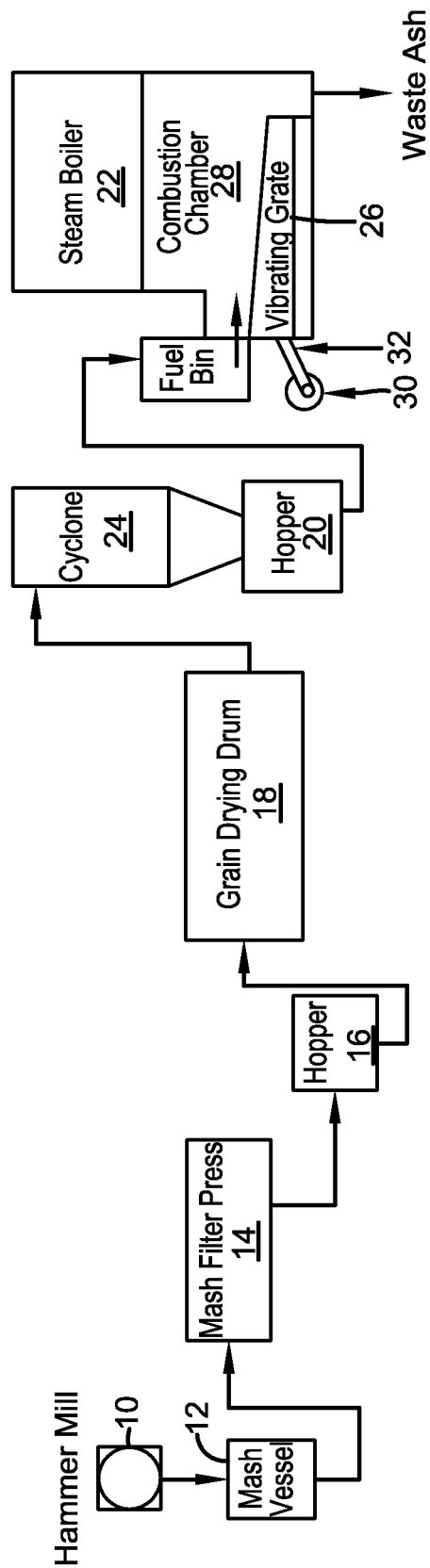
FIG. 1 illustrates an exemplary schematic flow diagram of a process for converting high protein organic materials, such as spent grain, into a combustible fuel.

Sources of spent grains, distillers grains and hops residues include breweries, distilleries and ethanol production facilities. High protein waste products made from grain (e.g., spent grain) hops residues and distillers grains are a by-product of a brewing process. In one form of the present disclosure, a high protein fermentation waste from spent grain is obtained primarily as a malt by-product of a beer brewing process which is processed to yield a high protein organic material which may be used as a fuel. A summary of this process is shown for illustrative purposes within FIG. 1 which for exemplary purposes describes the processing of spent grain into a combustible fuel, although various aspects of the process illustrated within FIG. 1 and described herein may also be applicable to processing other high protein organic materials into a combustible fuel. During brewing, the grain is first crushed or pulverized by a hammer mill 10 to reduce it to a finely ground median particle size generally less than 2 mm. In other aspects of the present teaching, the grain may be reduced to a median particle size of 0.25 mm to 0.6 mm with less than 1% of the grain being greater than 2 mm, however, this reduction in particle size is not necessary for combustion to occur as a higher protein content generally implies an improved combustion process for smaller particle sizes. The median, particle size between 0.25 mm to 0.6 mm means that fifty percent (50%) of the grain particle mass is greater than and fifty percent (50%) of grain particle mass is smaller than the median size. Pulverizing the grain reduces adhesion among various elements of the grain which normally serves to solidify the grain into one cohesive and air-impermeable mass upon combustion. It also increases the surface area of the particles to facilitate the reduction of moisture and increase combustibility. In one form of the present disclosure, the mill used in this instance is a Meura ClassicMill CLM3 model fine grinding hammer mill with horizontal shaft. This grinding process to obtain the desired particle size, for combustion, can be accomplished before or after the brewing and drying process, prior to combustion. Although the Meura ClassicMill CLM3 mill model is mentioned above, any other suitable device known to those of ordinary skill in the art may be used to pulverize the grain.

After pulverizing, the grain is moved such as by a drag chain conveyor to a mash vessel 12 and hydrated from which it may optionally be moved such as by a centrifugal pump to a mash filter press 14 where it is pressed. This step removes water mechanically from the grain material which controls the overall thermal efficiency of the process and allows excess heat to be available for other uses within the process. For example, heat vaporization of excess water wastes the application of heat energy which might be redirected for other beneficial uses such as steam generation for industrial use.

The latter process steps reduce the moisture content and removes soluble sugar and protein contents which also act as adhesives during subsequent drying of the spent grain. In certain aspects of the present teaching, the moisture content is reduced to below 65%. With these compounds reduced, the tendency of the grain particles to establish cohesion and structural integrity during subsequent drying and burning as a fuel is significantly reduced. The fact that the spent grain has been pulverized, also enables the cloth to act as a filter through which the moisture passes when the spent grain is pressed on the cloth. The latter also reduces the energy needed to further dry the spent grains before its use as fuel. In one preferred process of the present disclosure, a Meura 2001 mash filter press available in the industry may be used. However, other methods and devices may also be used to press the moisture and other soluble compounds from the spent grain as described above. Due to the compression of the spent grains to remove moisture, it is preferred that air pulses be directed into the spent grain on the filter cloth before opening the filter to help break up the spent grain cake to facilitate release of the spent grain from binding to the filter cloth when the filter is opened. The spent grain is then moved to a hopper 16 by a pneumatic pump from which it is moved to a grain drying drum 18 by an auger and pulled through the drier drum by a pneumatic fan, for example.

The next step in the process is that the spent grain is dried to further reduce the moisture content to ten percent (10%) by weight or less. In one embodiment, a rotating dryer drum 18 is used to receive the spent grain and is rotated while heated air in the drum subjects the spent grain to the desired drying temperature while the drum is rotating. The reduced finely ground spent grain particles helps speed up the drying process to reach the desired moisture level preferably ten percent (10%) or less by weight in order to increase its combustibility. A suitable dryer drum that can be used is one made by Baker Rullman which is readily available on the market. Other methods of drying the spent grain to sufficiently reduce its moisture content may of course be used. Also, grinding the dried spent grain can be done after the drying process to achieve the desired particle size distribution.

After having been processed as described above, the spent grain can be stored in a hopper 20 for immediate or eventual use as a primary fuel source. For example, the spent grain may be introduced in a boiler 22 used in a brewery to produce steam for heating the brew house vessels. In the embodiment shown in FIG. 1, the dried spent grain is moved to the hopper 20 by a cyclone 24. An auger is then used to convey the spent grain fuel into the combustion chamber 28. For combustion within the boiler 22 (e.g., a steam boiler), the spent grain is moved in any suitable manner, from the fuel bin through the combustion chamber 28, such as down an inclined grate 26 positioned within the combustion chamber 28 while the grate 26 is agitated or vibrated. In one process, a motor 30 connected by linkage 32 to the grate 26 is employed to vibrate the grate as the spent grain is moved through the combustion chamber 28. In another process, illustrated within FIG. 2, steam is injected into the combustion chamber 28 from a steam generator 40 during the combustion process. The timing frequency and intensity of the inclined grate agitation can be controlled and adjusted as needed for best combustion. The angle of the inclined grate being combined with the agitation or vibration of the grate helps to keep the spent grain moving through the combustion chamber while it burns to inhibit cohesion and solidification of its particles. Under normal circumstances, spent grain that has not been processed as described above tends to form a sponge-like impermeable, cohesive mass when heated which inhibits the transfer of oxygen and heat to the interior of the mass and thereby prevents sufficient combustion and generates large amounts of smoke while also causing an excessive buildup of material within the combustion chamber. In contrast, the process of the present disclosure not only sufficiently controls the moisture content and particle size of the spent grain, soluble proteins and sugars which act as binding agents during heating, but it also, through agitation and separation, breaks up the nitrogen bond cross linking and other cross-linking reactions (for example, non-nitrogen based cross-linking such as cross linking of soluble sugars during sugar decomposition) that occurs during thermal degradation of protein, all of which can inhibit combustion. In addition, the vibration and continual movement of the spent grain through the combustion chamber further breaks up the spent grain into smaller clumps thereby avoiding cohesion of the particles into an, agglomerated cohesive mass. This agglomeration of particles prevents sufficient heat transfer and diffusion characteristics for oxygen and water with the nitrogenous hydrocarbon combustion reactions of the agglomerated protein mass. In one process of the present disclosure, a King Coal combustion chamber may be used. After combustion, waste ash is collected and disposed of. The process of the present disclosure provides effective combustion of the spent grain to allow it to be used as the sole source of fuel, that is, without the need for combining it with a readily combustible fuel source such as wood, wood chips, wood by-products, fuel oil, natural gas, coal or other combustibles or additives to aid in combustion.

Figure 2:
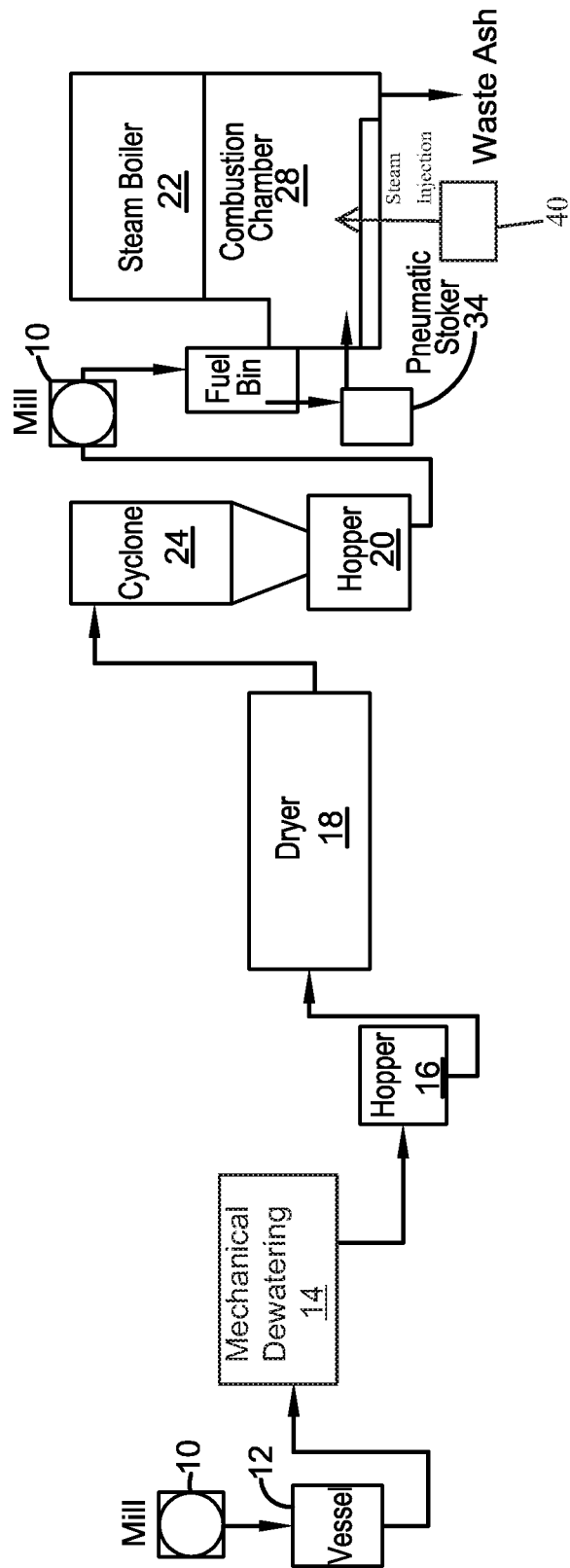
FIG. 2 illustrates an exemplary schematic flow diagram of a process which utilizes steam injection and a pneumatic stoker for converting high protein organic materials into a fuel.

In another process of the present disclosure, rather than separating the spent grain particles during combustion by vibrating or agitating the particles through means of the grate 26, linkage 32 and motor 30 as described above, the spent grain particles are separated and disbursed during combustion by being introduced or fed and sprayed into the combustion chamber by a device such as a pneumatic stoker. In one embodiment, as shown in FIG. 2, a pneumatic stoker 34 is connected to the combustion chamber 28 by a linkage 32 to blow the spent grain through the combustion chamber 28. The pneumatic stoker sprays the spent grain particles or particles of another type of high protein organic material into the combustion chamber thereby separating and disbursing the particles. The particles are ignited and burned while they are in suspension and separated from each other and before they can come into contact with and adhere to each other on the grate, bed, other surface or while suspended. This method also increases heat transfer to fully dehydrate the particles which needs to happen for protein denaturing to fully occur and increases the oxygen flow for combustion to allow the spent grain to be used as the sole fuel source in brewery boilers. In another process disclosed herein, steam is simultaneously injected into the combustion chamber 28 from a steam generator 40 during as the organic particulate material is sprayed within the combustion chamber by the pneumatic stoker.

The above-described process steps reflect the order of steps for processing a spent grain fuel product for combustion as disclosed herein. However, in the case of other fuels, the order of steps for processing the fuel for combustion may differ. For example, in some cases, the step of mechanically removing moisture and other soluble components from the fuel material as described in step 2 may be entirely eliminated.

As previously mentioned, the steps described above may generally be applied to other non-auto-combustible high protein organic materials. These other high protein organic materials include other high protein fermentation by-product materials such as distillers grains, yeast and hops residues, bio-solid waste materials from waste-water treatment plants, oil seed pulp (often called seed meal), animal excreta, and high protein meat production waste (including meat and bone meal, feathers, feather meal and animal excreta) and other high protein wastes. The waste materials provided herein may also be described as biological waste materials or organic materials or biological materials or as by-products. As is the case for spent grain, these high protein organic materials present combustion challenges which are difficult to overcome due to their respective high protein content. High protein organic materials that are traditionally considered as non-auto-combustible materials which may be used in a process for making a combustible fuel product typically have a protein content of about 10% or greater, on a dry weight basis (DWB) and are ordinarily considered insoluble. In other cases, high protein non-auto-combustible organic materials used for making a combustible fuel product have a protein content of about 20% or greater. High protein fermentation waste and waste by-products processed into a fuel product have a protein content ranging from about 25% to about 40%, on a dry weight basis (DWB). For example, hops residues through processing or concentrating of hops alpha/beta acids and hops oils has a protein content of about 25 to about 30%, on a dry weight basis (DWB). Bio-solids from waste-water treatment plants have a protein content ranging from about 10% or greater, on a dry weight basis (DWB) and in some cases from about 20% or greater, on a dry weight basis (DWB). Animal excreta has a protein content ranging from about 20% to about 50% or more, on a dry weight basis (DWB). For example, municipal waste-water treatment activated sludge and animal excreta processed into a fuel product can have a large protein content range of about 10% (DWB) to about 60% (DWB) depending upon the specific plant operations. High protein waste from agricultural sources of oil production processed into a fuel product has a protein content ranging from about 20% to about 50%, on a dry weight basis (DWB). For example, the general class of an oil seed pulp meal (e.g., including but not limited to sunflower or rape seed, soybean, corn, cotton seed, coconut, olive oil, etc.) fuel product has a protein content of about 35%, on a dry weight basis (DWB). Distillers Dried Grains are similar to brewers dried grains but from a distillery also has a protein content of about 30%, on a dry weight basis (DWB). High protein meat production waste and waste by-products processed into a fuel product have a protein content ranging from about 30% to about 85%, on a dry weight basis (DWB). For example, feather waste fuel product has a protein content of about 80% to about 85%. All of these materials are characterized as high protein by-products or waste materials which could be used as fuel products. In each of these alternative fuel types, the degree of hydration and the degree of pulverizing to achieve the appropriate particle size distribution for combustion is dependent upon the respective particles' adhesion characteristics and the protein content which is directly proportional to the nitrogen cross-linking capability at the molecular level. For example, during thermal degradation, the nitrogen bonds in proteins cross link in a macro mechanical way which results in clumping, crusting or clinkering of the fuel product. This restricts oxygen transmission, heat transfer and the diffusion of reaction compounds such as steam into the burning fuel. The low moisture content obtained by process step 3) and the small particle size obtained by process step 1) affects how quickly the temperature of the particle is raised. The process of quickly driving off the moisture and subsequently heating the particles degrades the proteins, denaturing them by essentially having the nitrogen bonds and other cross linking reactions react to complete all of their cross-linking ability on the surface of the particles if not all through the particles while they are agitated in suspension before the particles can touch other particles. Once the cross linking is complete, the particles will no longer adhere to each other. This arrests the particles tendency to adhere to each other via a nitrogen bond cross linkage and through other cross-linking reactions. The small particle size obtained from step 1) and the agitation and/or separation applied during step 4) keep the surface to oxygen and injected steam (water vapor) exposure appropriate for oxygen diffusion enabling complete appropriate combustion to be accomplished and for the injected steam (water vapor) to more effectively react with the nitrogen in protein. Steps 1) and 4) work in conjunction to produce a combustible fuel product. For instance, if the small particles were allowed to easily touch during protein thermal degradation, they would form larger clumps that would be glazed over with a cross linked protein layer reducing oxygen and steam diffusion necessary for regulatory compliant emissions during combustion. On the other hand, if the particles were too large to begin with, this would reduce the oxygen availability or diffusion necessary for complete combustion to occur as protein would cross link glazing over the larger particles reducing oxygen and steam (water vapor) diffusion necessary for regulatory compliant emissions during combustion.

Regulatory compliant emissions, are intended to encompass any set of standards established by any governmental regulatory agency to protect the environment. For example, in the U.S., emissions are in certain situations regulated to not exceed 20% opacity averaged over 6 minutes. The combustion process disclosed herein is capable of meeting this regulatory standard as well as other standards set by other agencies and governments of other countries including standards which are more stringent. For example, the combustion process disclosed herein is capable of meeting opacity requirements within time intervals shorter than six minutes, lower opacity levels averaged over 6 minutes, and is also capable of meeting regulations which require specific limits or amounts (e.g., pounds of NOX emissions). The present process can also achieve even lower limits than that which is currently required in the U.S.

As mentioned above, in the case of other high protein organic materials processed to become fuels, the order of steps for processing the fuel for combustion may differ and in some cases, the step of mechanically removing moisture and other soluble components from the fuel material as described in step 2) may be eliminated. For example, in one embodiment, the pulverizing step (i.e., step 1) above) and the drying step (i.e., step 3) above) may need occur in a different order to ensure that fine particles do not re-adhere together during the drying process right before they are fed into the combustion chamber.

To make a fuel product from hops residue, the hops must be processed to extract out oils and desirable compounds. The processing of hops to extract the oils and other desirable compounds leaves a high protein residue. In order to process the hops, a hops processor first dries the hops to obtain dry hops cones. Next, the dry hops cones are ground. Then, the hops is subjected to an extraction such as a $CO_2$ extraction or other mechanical separation technique known within the art to remove or concentrate the essential oils and other desirable compounds. Various types of extraction methods may be used in this process including but not limited to normal $CO_2$ extraction processes, $CO_2$ triple point extraction processes as well as other mechanical separation techniques suitable for use within the art. The separation and/or extraction process allows the desirable compounds to be removed or extracted from the hops, creating a by-product or hops residue waste material. In certain cases, after the waste or hops residue is removed or extracted, it may need to be re-ground. In some embodiments, the hops residue is dried and pre-ground but due to processing may reform into larger particle groupings that will need to be re-ground to a powder. After processing the hops residue for combustion, the hops residue may be agitated and/or separated as described above during the combustion phase to separate particles of the fuel product to inhibit their cohesion into an integrated mass. In certain embodiments, the separation step during the combustion phase is accomplished through the use of a pneumatic stoker. In other embodiments, the agitation step during the combustion phase is accomplished through the use of a vibrating grate. As described above, the process steps for making a fuel product from hops residue may occur in any order.

To make a fuel product from biological waste material, one can process municipal waste-water treatment activated sludge waste, which is a human bio-hazard which may contain PFAS and other fluorinated compounds (also referred to herein as polyfluoro impurities and polyfluoro compounds) and which may originate from industrial sources or fire safety control sources. Waste-water sludge which contain polyfluoro compounds such as PFAS cannot be used to make compost or otherwise treated and used for land applications. Sources of polyfluoro compounds such as PFAS that have contaminated waste-water sludge require the waste-water sludge to be treated differently such that the waste-water sludge can no longer be treated in a combustion process unless the combustion process also contemplates degrading PFAS and other fluorinated compounds. Rather, the combustion process must meet the standards required for combusting and degrading polyfluoro compounds, in particular, PFAS. The process encompasses controlling protein thermal decomposition by-products including ammonium, nitrogenous hydrocarbons, carbon monoxide (CO), carbon dioxide ($CO_2$), nitrogen oxides (NOX), nitrogen cations, nitrogen free radicals and other non-nitrogen containing free radical intermediate combustion reactants in the combustion gasses for further combustion with hydrogen fluoride and inorganic fluorine compounds, i.e., fluoride mineralized in the form of salts within the ash before such by-products are discharged into air. The process begins with the biological waste material starting off very wet (approximately 99% water). This first step is therefore to dewater the biological waste material as much as possible using flocking agents, centrifuges and dewatering separators. The biological waste material will then be dried typically on a heated rotating drum, a heat progressing filter belt, drum filter or other suitable drier. This results in dry flakes or pellets having less than 10% moisture which are too large and which will need to be pulverized. Thus, the processing of biological waste material into a fuel product requires the following steps: 1) mechanical removal of water, moisture and other soluble components from the biological waste material; 2) drying the biological waste material to reduce the moisture content to 10% or less by weight; 3) pulverizing the biological waste material to reduce the particle size to be less than 2 mm; and 4) agitating and/or separating the biological waste material as described above during the combustion phase to separate particles of the biological waste material to inhibit their cohesion into an integrated mass and 5) simultaneously injecting steam within the combustion chamber. The combustion process may occur within an integrated steam boiler, an incinerator, furnace or any other type of combustion chamber typically used by those of skill in the art to generate heat. In certain embodiments, the separation during the combustion phase is accomplished through the use of a pneumatic stoker. In other embodiments, the agitation step during the combustion phase is accomplished through the use of a vibrating grate or a combination of both a pneumatic stoker and a vibrating grate. It is noted that step 2) uses any means within the purview of an individual of suitable skill in the art to remove free water. Also, the high water content of the biological waste material requires the application of additional heat to the waste material in the drying step. In general, municipalities have an interest in applying the disclosed process not only for heat generation but more importantly, in order to dispose of bio-hazardous material via combustion. In addition, the dried waste product has a higher value as fuel than as other means of disposal. For example, use of land application for disposing biological waste material (if regulations allow) has a much lower revenue value to a municipality than the value that would be obtained if the biological waste material were to be used as a fuel for the production of heat.

To make a fuel product from animal excreta, one can process the animal excreta in a manner similar to the process steps described above with respect to biological waste material. Animal excreta, is a bio-hazard which also starts off very wet. This fecal material is first dewatered using thickeners, flocking agents, presses, centrifuges and dewatering separators to separate out the settable solids. Next, the settable solids are dried on commonly available industrial drying equipment such as a belt or drum drier. The resulting dry flakes or pellets are then pulverized. Thus, the processing of animal excreta into a fuel product requires the following steps: 1) mechanical removal of water, moisture and other soluble components from the animal excreta; 2) drying the animal excreta to reduce the moisture content to 10% or less by weight; 3) pulverizing the animal excreta to reduce the particle size to be less than 2 mm; and 4) agitating and/or separating the animal excreta as described above during the combustion phase to separate particles of the animal excreta to inhibit their cohesion into an integrated mass and 5) simultaneously injecting steam within the combustion chamber to assist in the combustion reactions and to maintain regulatory compliant combustion based upon the exact nature of the organic materials. In certain embodiments, the separation step during the combustion phase is accomplished through the use of a pneumatic stoker. In other embodiments, the agitation step during the combustion phase is accomplished through the use of a vibrating grate. It is noted that step 2) uses any means within the purview of an individual of suitable skill in the art to remove free water. Also, the high water content of the biological waste material requires the application of additional heat to the waste material in the drying step. This process may be applied by farms to not only generate some form of heat recovery but as importantly, to dispose of a bio-hazardous material rather than holding it until growing season for land application as fertilizer (farms hold this material for up to a full year). The benefit of employing this process is that the value of the waste stream as an energy source is much more significant than its value as a soil enhancement. Additional benefits of employing this process include reducing foul odor and reducing the liability for having exposed standing waste ponds which are regulated stringently by the regulatory agencies.

Oil seed pulp meal streams have a fairly high heating value. To make a fuel product from a high protein waste from an agricultural source of oil production such as oil seed pulp meal, the oil seed pulp meal undergoes a seed oil extraction. In the extraction process, high protein residue is separated from the oil and the pulp waste material (often called seed meal which maybe already dry (shelf stable)) and ground ready for animal feed processing. Additional drying and pulverizing steps may be applied to the oil seed pulp meal material as described above as deemed necessary. For example, in certain embodiments, the oil seed pulp meal material may be dried to reduce the moisture content to 10% or less by weight and then pulverized or in reverse order to reduce the particle size to be less than 2 mm. The oil seed pulp meal material is then agitated and/or separated as described above during the combustion phase to separate particles of the oil seed pulp meal material to inhibit their cohesion into an integrated mass while simultaneously injecting steam within the combustion chamber to assist in the combustion reactions and to maintain regulatory compliant combustion based upon the exact nature of the organic materials. The grinding step may occur immediately after the extraction step or may occur after a drying and pulverizing as described above. In certain embodiments, the separation step during the combustion phase is accomplished through the use of a pneumatic stoker. In other embodiments, the agitation step during the combustion phase is accomplished through the use of a vibrating grate. The pneumatic stoker and the vibrating grate may also be used together.

To make a fuel product from a high protein fermentation waste such as distillers grains, one would follow the process described above with respect to the processing of brewery spent grains. In this regard, distillers dried grains and any grains from the fermentation industry are regarded by those of skill in the art to be similar to those of brewers dried spent grains. In addition, the process described above may also be applied to other types of high protein waste.

To make a fuel product from high protein meat production waste and waste by-products such as meat and bone meal, feathers, feather meal and excrement (animal excreta), one may process the by-products or waste material by cooking and milling to stabilize the product so that it can be made into a feed supplement. One would then follow the general process described above with respect to other high protein organic waste materials.

The numerous types of non-auto-combustible high protein organic materials referenced above including high protein fermentation waste (e.g., distillers grains, yeast and hops residue), municipal waste-water bio-solid waste material, oil seed pulp waste, animal excreta, and high protein meat production waste and waste by-products may also be used as an additive in traditional combustion chambers for the destruction of polyfluoro compounds such as PFAS, organic fluoride (organo fluorine) compounds and non-organic mineralized organo fluorine compounds. Various examples of a process for using the various types of non-auto-combustible high protein organic materials to destroy polyfluoro compounds ("forever chemicals") such as PFAS, PFOS, PFOA and organic fluoride (organo fluorine) compounds are provided below. Examples are illustrated in Table 1.

The process disclosed herein for polyfluoro compound "forever chemical" (e.g., PFAS, PFOS, PFOA and organo fluorides) destruction may be applied in several unique applications. It is noted that the process disclosed herein degrades polyfluoro compounds "forever chemicals" (e.g., PFAS, PFOS, PFOA and organo fluorides) to non-organic mineralized fluorine compounds.

First, in certain cases, there are high protein non-auto-combustible organic materials that do not contain PFAS, where PFAS contaminants can be added to the combustion chamber. An example of how this is done is through the use of a pneumatic stocker where PFAS contaminants may be added with the spent grain fuel feed. The PFAS "contaminated wastes" are destroyed in the general combustion environment outside of the particle "reaction cells". For example, PFAS contaminated soils may be added to the process using a pneumatic stoker and PFAS contaminated wastes are destroyed in the "combustion environment".

Second, there are high protein non-auto-combustible organic materials that contain PFAS or "forever chemicals". An example of this is found in bio-solids from municipal waste-water treatment plants. These "contaminated wastes" may be used as a primary fuel without any additional fossil fuel required. The PFAS or "forever chemicals" are integrated into the high protein non-auto-combustible organic materials. Consequently, this primary fuel is where the particles act as "reaction cells" as this is where the protein/nitrogen, moisture, and PFAS chemistry resides. Augmenting the incineration with a secondary fossil fuel is an option but not a necessity. A process which uses a pneumatic stoker is an example of how PFAS or "forever chemical" contaminated bio-solid wastes from a municipal waste-water treatment plants may be destroyed.

Third, there are existing PFAS or "forever chemical" destruction technologies (such as fluidized bed incinerators) which use entirely fossil fuel (or other traditional fuels such as wood, coal, natural gas etc.) for their energy source where the addition of high protein non-auto-combustible organic materials will lower the required temperatures and costs of operations. These technologies destroy PFAS and "forever chemical" wastes and substantially use heat energy from fossil fuels. By adding high protein non-auto-combustible organic materials that do not (or do) contain PFAS to the fluidized bed incinerator, it is possible to operate the fluidized bed at lower temperatures and save on operating costs. More importantly, this method or type of operation allows for a larger class of PFAS wastes to be destroyed. In this method or operation, the "reaction environment" may be modified by adding high organic protein to the combustion environment. A second style of combustion apparatuses that provides a "reaction zone" includes a progressive cavity incinerator, an agitated bed incinerator, or an advancing chain combustion chamber. These types of combustion chambers have zones where there is a progression of combustion atmospheres as the fuel passes through the combustion chamber. For example, in these embodiments, a subsequent introduction of water can be affected in the combustion chamber. Early stages of combustion may be kept in a low moisture environment (other than combustion sources of water) and moisture may be subsequently injected to modify the combustion chamber chemistry later in the process. This process is discussed in greater detail below.

Accordingly, the present disclosure also provides a process for converting hazardous compounds to less hazardous substances in a more traditional combustion temperature range. The process includes the steps of 1) providing an auto-combustible organic fuel (e.g., any traditional type of fossil fuel (e.g., coal, oil or gasoline); and 2) providing a non-auto-combustible organic material as disclosed above. The non-auto-combustible organic material is a high protein organic material having a protein content of about 10%, on a dry weight basis (DWB) or greater. The process initially includes the steps of mechanically removing liquid and soluble components from the high protein organic material; applying heat to dry the organic material to reduce its moisture content to 10% or less, in some cases, low as five percent (5%) or less by weight; and pulverizing the high protein organic material to reduce the high protein organic material to a particle size of less than 2 mm. These steps, referred to as pre-combustion steps may occur in any order depending on the processing requirements of the specific non-auto-combustible organic material. The non-auto-combustible organic material is then injected into a combustion chamber by spraying. The spraying of the non-auto-combustible high protein organic material into the combustion chamber may be accomplished through use of a pneumatic stoker and has the effect of separating particles of the high protein organic material within the combustion chamber to thereby inhibit their cohesion into an integrated mass during combustion. While being sprayed into the combustion chamber, moisture regulated air is injected into the combustion chamber. Subsequently or simultaneously, while being sprayed into the combustion chamber, steam may be injected into the combustion chamber to enhance combustion characteristics of the high protein organic material. The overall combustion process occurs at a temperatures of about 1,000° C. or 1,800° F. to less than 1400° C. and at residence times of less than one second. This combustion temperature may be achieved by controlling factors such as the feeds into the combustion chamber and combustion chamber design (i.e., volume-mass-heat loss and the energy input that results in temperature of combustion). These factors dictate the concentration of thermal decomposition products in the combustion chamber which includes energy. The combustion process may also include the steps of introducing high energy ultraviolet (UV) light and other energy sources such as microwave, radiofrequency and other plasmas into the combustion chamber or later in the exhaust gas transport processes after combustion, which at these later stages may have much lower temperatures for example less than 800 degrees Fahrenheit. This high energy input will assist with producing free radical intermediate combustion reactants, for example Ozone ($O_3$), in the combustion gasses to degrade PFAS and other carbon-fluorine based compounds which otherwise cannot occur at the elevated temperatures in the combustion chamber. Protein thermal decomposition by-products are subsequently allowed to react with nitrogen oxides (NOX) in the combustion chamber to form water ($H_2O$) and nitrogen ($N_2$). Protein thermal decomposition by-products remaining after combustion include ammonium, nitrogenous hydrocarbons, carbon monoxide (CO), hydrogen ions (H+), hydroxide ions (OH), ozone ($O_3$), sulfur oxides (SOX), carbon dioxide ($CO_2$), nitrogen oxides (NOX), nitrogen free radicals, nitrogen cations, nitrogen anions and other non-nitrogen containing free radical intermediate combustion reactants in the combustion gasses. It is noted that nitrogen oxide (NOX) production in the combustion chamber ranges from about 100 parts per million (ppm) to 350 parts per million (ppm) or greater, that sulfur oxide (SOX) production in the combustion chamber ranges from 0 to about 25 parts per million (ppm), that carbon monoxide (CO) production in the combustion chamber ranges from about 10 to about 100 parts per million (ppm). The amount of protein thermal decomposition by-products produced during combustion in the combustion chamber is controlled to provide optimal conditions for decomposition of polyfluorocarbon compounds. Polyfluorocarbon compound impurities present in the processed non-auto-combustible high protein organic material in the combustion chamber are incinerated in the combustion process. Additional polyfluorocarbon containing compounds may also be added in the combustion chamber for incineration as an alternative or additional step. For example, the non-auto-combustible high protein organic material may be used as an additive to other traditional fuels to assist in the destruction of polyfluoro compounds (e.g., PFAS, PFOS, PFOA, PFOS) to lower the required combustion temperatures and residence times. Many polyfluoro compound materials or materials tainted with polyfluoro compounds may not be combustible. Therefore, these wastes must be incinerated. Using non-auto-combustible high protein organic material as an additive to other traditional fuels for incinerating such wastes lowers the cost of process equipment (a capital expense) and process expense (operating expense) with the lower temperatures and residence times for incineration that are achieved. It also lowers the possible complications that may result with fusing of waste materials containing these types of contaminants. It is noted that NOX and the protein thermal decomposition by-products carbon monoxide (CO), sulfur oxides (SOX), hydroxide ions (—OH), hydrogen ions (H+), and ozone ($O_3$), function as a reactive environment for incinerating fluoro-carbon compounds and degrading hazardous polyfluorocarbon compounds into less hazardous substances.

Combustion air is a source of moisture based upon its relative humidity. The step of dehydrating and lowering the amount of moisture of air that enters the combustion chamber has an effect in the combustion chemistry and subsequent free radical components produced in the combustion chamber. The reduction of moisture in the combustion chamber air affects the concentration of nitrous oxides (NOX), sulfur oxides (SOX), carbon monoxide (CO), hydrogen radicals (H), hydroxide (OH) radicals, nitrogen free radicals, nitrogen cations, nitrogen anions, other non-nitrogen free radicals and other free radicals in the combustion chamber. Controlling the type and concentration of free radicals in the combustion chamber allows forever chemical (e.g., PFAS and other carbon-fluorine containing compounds) reactants to decouple the carbon fluorine bond, allowing fluorine to combine into non-carbon based forms, ultimately to hydrogen fluoride (HF) and fluorine mineral salts such as silicon tetrafluoride ($SiF_4$) (see other examples in Table 2). In the present case, the moisture in the air as it enters the combustion chamber may be controlled with desiccants or refrigerated driers prior to introduction into the combustion chamber. According to certain embodiments, air may be dried to have a moisture content of less than 1,000 parts per million as it enters the combustion chamber. Such air may for example have a moisture content of over 20,000 parts per million at 70° F. if the dehydration step were to be omitted. Combustion air can contribute up to 15% of the water present in the combustion chamber. Through the dehydration step, drying, for example, air at 70° F. and 95% relative humidity has the effect of removing approximately 14% of the moisture in the combustion gasses.

Dehydrating the non-auto-combustible high protein organic material to have a moisture content of 5% or less also affects the combustion chemistry and subsequent free radical components. The reduction of moisture in the non-auto-combustible high protein organic material that enters the combustion chamber air affects the concentration of nitrous oxides (NOX), sulfur oxides (SOX), carbon monoxide (CO), hydrogen radicals (H) and hydroxide (OH) radicals, nitrogen free radicals, nitrogen cations, nitrogen anions, other non-nitrogen free radicals and other free radicals in the combustion chamber. Controlling the type and concentration of free radicals in the combustion chamber allows forever chemical reactants (e.g., PFAS and other fluorine-carbon containing compounds) to decouple the carbon fluorine bond, allowing fluorine to combine into non-carbonaceous forms, to hydrogen fluoride (HF) and fluorine mineral salts such as silicon tetrafluoride ($SiF_4$) or other compounds (see examples in Table 2). In comparison, a moisture content of 10% contained in the high protein organic non-auto-combustible fuel can account for approximately 8% of the moisture in the combustion chamber. Reducing the moisture content of the high protein organic non-auto-combustible fuel to 5% or less can reduce the total moisture in the combustion chamber by 4%. In the present case, the reduction of moisture in the high protein organic non-auto-combustible fuel may be accomplished through additional residence time or by drying the fuel at higher temperatures.

The issue of controlling NOX, H+, CO, —OH, SOX, $O_3$, nitrogen free radicals, nitrogen cations, nitrogen anions, other non-nitrogen free radicals, mineral salts, and other free radicals in the destruction of PFAS may be viewed as a regulatory balancing act. The balancing act involves a desire to lower the "bad" emissions of NOX and other free radicals yet allowing enough of these free radicals to be present to help destroy PFAS at lower combustion temperatures. While it is possible to lower the NOX levels for example to be under common regulatory NOX limits, it is also desirable for NOX levels to be high enough to attack the carbon-fluorine bonds in PFAS, to destroy these forever chemicals. The process involves controlling (i.e., by increasing or lowering) the amount of NOX, H+, CO, —OH, SOX, $O_3$, nitrogen free radicals, nitrogen cations, nitrogen anions, other non-nitrogen free radicals, mineral salts and other free radicals and where they react with PFAS. The water content in the combustion chamber lowers the NOX, SOX which are regulated emissions, along with affecting the type and quantity of other free radical compounds. Regulations implemented by the Environmental Protection Agency (EPA) seek to lower the amount of these compounds rather than allowing for a high amount of these compounds. The process disclosed herein has competing objectives in that these compounds are controlled to ensure higher amounts of NOX with other free-radicals are present in sufficient amounts to attack the C—F bonds at lower temperatures so that more PFAS is disrupted at these lower temperatures. This allows more traditionally and economically constructed equipment. Consequently, these are competing desires for the combustion operations and for regulators. By controlling the combustion atmosphere chemistry, i.e., by increasing NOX along with controlling other compounds, it is possible to attack PFAS at lower temperatures. (In essence, the fuel particles act as "reaction cells" in that high protein non-auto-combustible waste particles function as active reactors that have unique "micro-climates" in the interior of the particles and directly around the exterior of the particles which are distinct and separate for the greater combustion chamber environment). There are four main controls that can influence the concentration of NOX, SOX, CO, $CO_2$, hydrogen ions (H+), hydroxide ions (OH$^-$), ozone ($O_3$), nitrogen free radicals, nitrogen cations, nitrogen, anions, other non-nitrogen free radicals, ammonium and other nitrogenous compounds and other free radicals in the combustion chamber. First, there is the type of fuel used (e.g., fuel oil, wood, non-auto combustible high protein organic material, etc.) as this contributes to the varied specific compounds that end up in the combustion gasses which influence the combustion chemistry. Second, there is the resulting temperature of combustion which is the result of the specific feed rates of each of the following—the type of fuel used, the combustion air content, and other mass flow inputs as these factors will directly influence the temperatures of the combustion chamber. Third, the amount of moisture (e.g., steam, moisture content of the fuel, etc.) that is allowed in the combustion process plays a role in controlling the amount of byproducts as the amount of water greatly influences the combustion chemistry reactions. Fourth, any additional mass added to the combustion chamber such as contaminated soils that contain PFAS plays a role in the amount of byproducts present as the additional mass functions a thermal load without adding any significant fuel for combustion.

When using non-auto-combustible high protein organic material as an additive to existing traditional combustion atmospheres to lower the combustion temperatures necessary for PFAS destruction or if adding PFAS contaminated wastes that have no combustion capability to an existing combustion platform using high protein traditionally non-combustible fuels, the combustion environment may be modified to optimize the conditions for PFAS destruction. By regulating where the moisture is introduced and at what concentrations, it is possible to balance competing regulatory affects yet target PFAS destruction. One complex mechanism that may be employed is to control the moisture in the contaminated wastes to increase the amount of NOX/SOX/free-radicals in those "PFAS contaminated zones or environments" during combustion. The use of high nitrogen combustion by-products to create "PFAS destruction zones or environments" is due to the high nitrogen content of the protein which is being used as fuel. This organic nitrogen being thermally degraded is what causes the high NOX concentrations along with other free radicals reactants to form. By controlling the moisture content of the PFAS contaminated wastes, a higher concentration of NOX with other free radicals is achieved. This higher concentration of NOX with other free radicals is what facilitates the disrupting of the carbon-fluorine bonds and lets fluorine react to form hydrogen fluoride and possibly to further react with the ash to form fluoride minerals or remaining as hydrogen fluoride. Concurrently PFAS is a solid concentrated on the PFAS contaminated waste particle which allows the concentrated reaction components to be confined to react in the "PFAS contaminated zones or environments" of the combustion chamber. Once the gasses leave the "PFAS contaminated environment or zone" and the NOX/SOX/free-radicals hit the greater combustion chamber atmosphere, a higher moisture content is obtained that lowers the NOX and controls the amount of other free radicals, thereby achieving what may seem as a competing regulatory objective. Accordingly, the method disclosed herein allows for the destruction of PFAS in the "PFAS contamination environments or zones" and the ability to lower these NOX reactants afterwards in the combustion chamber after PFAS has been destroyed. Destruction of PFAS is very important and may be regulated as more important to the regulations governing NOX/SOX and other regulated emissions. The present technology contemplates the tools or techniques necessary to help balance the above objectives. Also, different types of PFAS compounds will have different reaction characteristics. Accordingly, combustion parameters may be or are varied based upon the PFAS specific challenges for different PFAS containing wastes.

Another attribute of "Particle Reactions Cells" is that the minerals present and concentrated in the fuel particles that can react with fluorine are also solids. Again, as the carbon-fluorine bonds are disrupted, a hydrogen-fluorine bond is created that can then react with the mineral ash component of the high protein fuel and form stable non-organic fluoride mineral salts.

As mentioned above, protein thermal decomposition by-products remaining after combustion include ammonium, nitrogenous hydrocarbons, carbon monoxide (CO), sulfur oxides (SOX), carbon dioxide ($CO_2$), nitrogen oxides (NOX), hydrogen ions (H+), hydroxide ions (OH), ozone ($O_3$), nitrogen free radicals, nitrogen cations, nitrogen anions and other non-nitrogen containing free radical intermediate combustion reactants in the combustion gasses. Typically, nitrogen oxide (NOX) levels over 150 parts per million (ppm) only form at temperatures well over 1,800° F. However, with organic nitrogen in the high protein non-auto-combustible organic fuel, levels of 350 parts per million (NOX) can be achieved at relatively low temperatures, i.e., 1,000° C. or 1,800° F. Higher nitrogen oxide (NOX) levels (i.e., levels over 300 ppm) as well as sulfur oxide (0 to 25 ppm) and carbon monoxide levels (10 to 100 ppm) in the combustion chamber may be achieved or controlled by lowering the moisture content in the combustion chamber as discussed above by dehydrating the air that enters the combustion chamber and by dehydrating the moisture content of high protein non-auto-combustible organic fuel to less than 5%. Increasing the amount of nitrogen oxide (NOX) free radicals as a combustion byproduct, possibly in conjunction with plasma (UV light, electrical or radio energy) introductions, in the combustion chamber has a beneficial impact in destroying PFAS and other fluorine containing compounds in that it assists in disrupting and decoupling the carbon-fluorine bond allowing fluorine to combine into less stable forms to ultimately form hydrogen fluoride and fluorine mineral salts such as silicon tetrafluoride ($SiF_4$) (and other compounds provided in Table 2), thereby reducing the concentrations of forever chemicals. The silicon-fluorine bond is one of the strongest chemical bonds in nature being stronger than the carbon-fluorine bond.

The steps of introducing ultra-violet light into the combustion chamber or in the subsequent combustion exhaust gas transport ducting produces highly reactive radicals. One of the pathways to carbon-fluorine bond decoupling is by the reaction highly reactive radical compounds such as $O_3$ with carbon. This frees up fluorine to couple with hydrogen or minerals like silica. Without high energy ultra-violet light being introduced, levels of $O_3$ are almost non-existent in the combustion chamber. With its induced formation of highly reactive radicals, $O_3$ (ozone) and other free radicals will become present in the combustion chamber or in the subsequent combustion exhaust gas transport ducting after steam production, and will react, assisting with carbon-fluorine bond disruption. This may be accomplished by shining an industrial lamp emitting high energy ultraviolet light into the combustion chamber or in the subsequent combustion exhaust gas transport ducting through quartz lenses, thereby initiating additional free radical development in the combustion gas mixture that would not otherwise occur. As an explanatory note, ozone will not form in the combustion chamber as it is at too high a temperature for ozone to chemically exist. However it can form at the lower temperatures of 600° F. (315° C.) downstream of the steam generation unit catalyzed for example by NOX and UV light for example (see FIG. 4 which illustrates the possibility of external energy inputs such as ultra violet light, radio waves, plasma, etc. being input directly into the combustion chamber or downstream from the steam generation unit at a lower temperature).

The step of introducing energy sources such as microwave, radio frequency and plasmas (i.e., electrically induced plasma energy sources) into the combustion chamber or in the subsequent combustion exhaust gas transport ducting has the effect of exciting the energy state of carbon-fluorine bonds and other reactants, thereby increasing the disruptive forces and enhancing carbon-fluorine bond decoupling. Assisting in the disruption of the carbon-fluorine bond allows for decoupling fluorine from carbon and frees the Florine as an anion to combine with other compounds, thereby reducing the concentration of forever chemicals. These energy sources may be introduced into the combustion chamber or subsequent combustion exhaust gas transport ducting through a process of electrical inducement.

The above described process for converting hazardous compounds to less hazardous substances in a traditional combustion chamber may be achieved with lower temperatures and contact times than what is regarded in the industry as required for destroying such compounds. On Nov. 16, 2021, the Environmental Protection Agency (EPA) published a notice regarding the management of PFAS Waste Systems through incineration and included a link to "PFAS Incineration Technical Brief" (pdf). In the notice, the EP states, "For unimolecular decomposition, fluorinated organic compounds likely require higher temperatures to achieve 99.99% destruction in one second residence time than do their chlorinated counterparts." The EPA further states in the Notice, "The most difficult fluorinated organic compounds to decompose is $CF_4$, requiring temperatures over 1,400 degrees C., but is easily monitored, making it a potential candidate for destructibility trials." This implies that the benchmark to destroy PFAS and other fluorine containing compounds is 1,400 degrees C. (2,550 degrees F.) with a residence time at that temperature of one second. However, the majority of bio-mass combustion systems are not capable of operating at the EPA recommended temperatures for incineration of such compounds. At such temperatures (e.g., 1,400° C. or higher), biomass ash mineral content fuses causing glass formation. This quickly results in equipment failure in the combustion chamber, known as clinkering. The process disclosed herein, however, overcomes this issue in that it is capable of incinerating PFAS and other fluorine containing compounds referenced herein at temperatures much lower than those prescribed by EPA and may be as low as about 1,000 degrees C. or 1,800 F and at residence times of less than one second. The present process achieves this improvement in PFAS and other fluorine containing compounds at a lower temperature and residence time by using a high protein fuel in combination with a pneumatic stoker. By incinerating at lower temperatures, fusion of minerals in biomass ash can be avoided, thereby avoiding clinkering and the resulting destruction of the combustion chamber and its associated components. This results in several advantages on a practical level. First by using a lower temperature for combustion, the heat loss due to radiation, convective and conductive heat transfer to the environment can be lowered, thereby making the system more economical. Second, conventional combustion equipment may be used saving costs and risk of performance compared to having to manufacture customized combustion equipment for the higher temperatures recommended by existing EPA guidelines for destruction of PFAS and other fluorine containing compounds. Finally, by using biomass feedstocks, the use of a renewable fuel provides the dual benefit of replacing fossil fuels while destroying PFAS and other fluorine containing compounds.

In each of the processes described above with respect to high protein bio-solids from waste-water treatment plants; high protein animal excreta; high protein fermentation waste and waste by-products; high protein waste from agricultural sources of oil production, high protein waste by-products and high protein by-products; and high protein meat production waste by products and by-products, the separation step during combustion may be applied by a pneumatic stoker or by an auger which drops the grain onto a vibrating bed and transfers the fuel product to the combustion chamber through an incline or a combination of both. However, by blowing or spraying the particles into the combustion chamber, the pneumatic stoker keeps the particles separated in the combustion chamber long enough to allow the heat transfer provided by the combustion process to quickly dry the particles out and to degrade the proteins and other compounds within the combustible fuel product. This prevents nitrogen-based cross linking and other non-nitrogen based cross-linking reactions. Examples of non-nitrogen based cross linking reactions include cross linking of carbohydrates (these can include simple sugars to more complex dextrins) during thermal decomposition between the particles that would result in the particles adhering to each other. This unique feature for addressing cross linking and then also degrading proteins with steam is not considered by combustion technologists and therefore not addressed in traditional feeding mechanisms of potential non-auto-combustible fuel into the combustion chamber.

As mentioned above, the combustion process provides for both quickly driving off the moisture and subsequently heating the particles to denature the proteins. Although the timing of these events occurs relatively quickly for the particles to be fully dehydrated for combustion, the process also requires the input of water or moisture into the combustion chamber in order to facilitate certain chemical combustion reactions within the combustion chamber. In short, there are four sources for introducing water or moisture within the combustion chamber. Those sources include water or moisture within the combustion air which supports the combustion process, water or moisture within the particle itself that is to be combusted, and combustion reactions which generate water and steam which is injected into the combustion chamber. By controlling the amount of water or moisture that is introduced within the combustion chamber from these four sources, the temperature of the combustion process can be controlled and combustion reactions can be influenced to maintain regulatory compliance in order to utilize otherwise non-auto-combustible high protein organic material or waste product or by-product as a fuel. Water produced during combustion is basically the result of oxidation of hydrocarbons which primarily produce carbon dioxide and water. Water is also an active part of many intermediate combustion reactions. The majority of water in traditional combustion comes from the fuel combustion reaction products and a much smaller amount which comes from the water or moisture in the fuel itself (assuming this water concentration is 10% moisture or less) and from the humidity in combustion air. In the disclosed process, a significant amount of water in the form of steam comparable to the amount produced due to combustion is injected into the combustion chamber. In certain aspects of the present disclosure, the amount of water (i.e., steam) injected into the combustion chamber in the form of steam may be equivalent or nearly equivalent to the amount produced during normal combustion. Under certain operating conditions, by injecting a nearly stoichiometric equivalent amount of water in the form of steam, the reaction kinetics are affected to influence the balance of the products verses the reactants in the combustion reaction itself. However, in other aspects of the present disclosure, it may not be necessary to inject an equivalent, stoichiometric equivalent or nearly stoichiometric equivalent amount of water or steam within the combustion chamber to achieve the desired results as injecting such an amount of water or steam into the combustion chamber may not assist and/or may hinder combustion under certain conditions. In addition, it is also noted that the reaction of nitrogenous hydrocarbons (e.g., intermediate ammonium and other nitrogen containing compounds such as nitrogen free radicals) assists in gasifying the nitrogen from protein thermal combustion products that aids in nitrogen oxide (NOX) control.

Without steam injection, the water content in the combustion chamber could be less than 8% due to the water in the fuel, less than 15% could be from water contained in the combustion air and over 77% could be from the combustion reactions. With steam injection comparable to the combustion water source, these ratios change to less than about 4% of the water being from the fuel, less than about 8% of the water being from the combustion air, about 44% of the water being from combustion sources and about 44% of the water being from direct steam injection.

While steam is used in traditional combustion to mechanically move and manage ash transport in combustion chambers, to lower temperatures and to effect coal gas reactions (CO and CH4), the use disclosed herein is unique in its effect on the nitrogen content of the high protein organic waste materials. In particular, the combustion reactions disclosed herein are capable of controlling NOX levels compared to traditional processes applied to other readily combustible fuels.

This regulatory combustibility of traditionally non-auto-combustible waste products is achieved by influencing the temperature of the combustion which also influences the amount of NOX (Nitrogen Oxides) production during the combustion process. This allows organic fluorine compounds to be converted to mineralized inorganic fluorine compounds. Through the introduction of steam within the combustion chamber, the temperature of the combustion chamber can be controlled, nitrogenous hydrocarbons compounds are reacted with water and combustion reactions can be influenced so that NOX production (elevated or non-elevated amounts) can be controlled. This provides additional agitation which also provides additional time for the particles to heat up allowing nitrogen cross-linking and other cross linking reactions within the particles to occur before ignition and combustion. Accordingly, the injection of steam within the combustion chamber allows one to control the combustion process between various types of high protein organic materials providing optimal conditions for combusting high protein organic materials that are typically not auto-combustible. This also allows for organo fluorine compounds to be degraded by mineralizing the fluorine.

In addition to injecting steam within the combustion chamber, in certain aspects of the process disclosed herein, it may be desirable to increase the protein content of the high protein organic material before it enters the combustion chamber. This may be accomplished by injecting a secondary high protein organic material such as yeast, precipitated proteins, spent hops or other high protein materials within the high protein organic material before it is pulverized (ground) and/or before it is dried. For example, the addition of yeast may be added to increase the protein content of wet spent grain before it enters the drier.

The process described above allows for the effective combustion of high protein organic materials (e.g., biosolids from waste-water treatment plants; animal excreta; high protein fermentation waste and waste by-products; high protein waste from agricultural sources of oil production waste by-products and by-products; and high protein meat production waste and waste by-products) which allows for a specific type of high protein organic material to be used as the primary sole source of fuel. While these wastes or by-products may be incinerated and burnt without undergoing the process described above, combustion can only occur when the majority of the energy comes from traditional auto-combustible fuels like wood products and wood by-products; hydrocarbons like natural gas, coal and fuel oil. The process disclosed herein eliminates any need to combine the high protein organic material with a readily combustible fuel source such as wood, wood chips, wood by-products, coal, fuel oil, natural gas, coal or other combustibles or additives to aid in combustion. The process disclosed herein further allows the high protein organic material to undergo combustion within a furnace, steam boiler, incinerator or other combustible chamber as a primary or as a sole fuel source.

The above-described process can be described in the following five steps: 1) pressing the fuel material to mechanically remove moisture and other soluble components; 2) drying the fuel material to reduce the moisture content to 10% or less by weight; 3) pulverizing the fuel material to reduce the particle size to be generally in the range less than 2 mm; 4) agitating and/or separating the fuel product during the combustion phase to separate particles of the fuel product to inhibit their cohesion into an integrated mass; and 5) injecting steam within the combustion chamber to enhance the combustibility of the spent grain and to regulate the nitrogenous hydrocarbon combustion reactions related to the organic nitrogen contained in the proteins or otherwise high protein non-combustible organic material. Although the order of steps generally follows the sequence of steps mentioned above, in certain embodiments, the pulverizing step (step 1) may occur after the drying step (step 3) but prior to combustion (step 4).

With respect to the combustion of these examples of high protein biological materials as fuel products, one might assume that these fuel products would have abnormally high NOX (Nitrogen Oxides) emissions due to the high protein and organic nitrogen content of these fuels. In fossil fuels, even a slightly elevated nitrogen content results directly in elevated NOX production. However, the present process controls nitrogen oxide formation to levels ranging from about 100 ppm to greater than 300 ppm, in some cases greater than 350 ppm or more. This is due to the relatively weak binding of nitrogen to the carbon-based proteins and its combustion reactions with excess water provided for in the present process by steam injection. In essence, the chemical path of protein thermal decomposition allows the nitrogen to take an intermediate step to form urea, ammonium compounds and even ammonia in the present process. It is noted that ammonia is sometimes injected into combustion furnaces for boilers to lower NOX production. This is represented by the following generically balanced general chemical formula: $aNH_3$ (ammonia)+$bNOX$ (nitrogen oxides)=$cN_2$ (nitrogen)+$dH_2O$ (water). Where a, b, c and d will vary numerically based upon the actual form that the NOX takes. The present process does not necessarily require the partial injection of ammonia into the combustion chamber due to the type of organic protein combustion reactions which occurs during the process which include the generation of nitrogenous hydrocarbons (e.g., intermediate ammonium and other nitrogen containing compounds). In any event, the presence of the weak nitrogen bonded protein generates ammonia and other nitrogenous hydrocarbon compounds formed in the present process within the combustion chamber which allows combustion of high nitrogen content fuel to be used without higher NOX production. Accordingly, the present disclosure also encompasses a process for making a combustible fuel product from a non-auto-combustible high protein biological material used as an additive with injected steam for a combustion system to enable having controlled nitrogen oxide (NOX) production wherein protein thermal decomposition by-products react to mineralize fluorine from organo fluorine compounds and achieve polyfluoro compound and organo fluorine compound destruction.

According to certain aspects of the present teaching, the concentration of protein thermal decomposition by-products produced during combustion within the combustion chamber including nitrogen oxide (NOX) production, sulfur oxide (SOX) production, hydrogen ion (H+) production, hydroxide ion (OH⁻) production, ozone ($O_3$) production, nitrogen free radicals, nitrogen cations, nitrogen anions, oxygen free radicals, hydrogen free radicals, carbon free radicals, silicone free radicals, sulfur free radicals, phosphorous free radicals, metal free radicals including metal cations listed in Table 2, and carbon monoxide (CO) production may be adjusted by controlling the moisture present in the individual particles of the non-auto-combustible high protein organic material (which act as reaction cells) and by controlling the moisture in different areas or zones in the combustion chamber. The moisture content of the individual particles and the combustion chamber may be controlled by using any or all of the steps (2) (mechanically removing liquid and soluble components from the high protein organic material and combustion targeted components); (3) (applying heat to dry the organic material and combustion targeted components to reduce its moisture content to ten percent (10%) or less by weight), (6) (optionally, drying combustion air and injecting dehydrated combustion air having a moisture content of less than 1,000 parts per million (ppm) into a first zone of the combustion chamber) and (7) (injecting steam into a second zone of the combustion chamber to enhance combustion characteristics of the high protein organic material) which will cause the concentrations of the thermal decomposition by-products to vary in the various areas or zones in the combustion chamber. The concentrations of the thermal decomposition by-products in the combustion chamber is measured in terms of aggregate amounts as there are high concentration "micro" reactions zones in the particle (reaction cells) that have higher concentrations of reactants than other areas within the combustion chamber. Moreover, the concentration of thermal decomposition by-products is measured at "measurement ports" which are positioned in large mixed/mixing zones in the combustion chamber. Thus, the measurements take into account a blend the reactions that are measured in terms of one aggregate value. Thus, in some cases, the concentrations in specific areas or zones may be higher or lower than the aggregate concentration of: about 100 parts per million (ppm) to about 350 parts per million (ppm) for nitrogen oxide (NOX) production; from 0 to about 25 parts per million (ppm) sulfur oxides; and from about 10 to about 100 parts per million (ppm) carbon monoxide. Accordingly, these concentrations may vary from the aggregate amounts in different areas or zones in the combustion chamber and exhaust gas.

As mentioned above, the non-auto-combustible organic material used as a fuel is a high protein organic material having a protein content of about 10%, on a dry weight basis (DWB) or greater. In general, protein thermal decomposition by-products resulting from the combustion of non-auto-combustible organic material having a protein content from about 10% to about 20% is capable of producing an aggregate nitrogen (NOX) content ranging from about 100 parts per million (ppm) to about 350 parts per million (ppm). According to further aspects of the present teaching, protein thermal decomposition by-products resulting from the combustion of non-auto-combustible organic material having a protein content of from about 20% to about 30% is capable of producing an aggregate nitrogen (NOX) content from about 350 parts per million (ppm) to about 600 parts per million (ppm); whereas protein thermal decomposition by-products resulting from the combustion of non-auto-combustible organic material having a protein content from about 30% to about 60% is capable of producing an aggregate nitrogen (NOX) content ranging from about 600 parts per million (ppm) to about 1000 parts per million (ppm); whereas protein thermal decomposition by-products resulting from the combustion of non-auto-combustible organic material having a protein content of from about 60% to about 80% is capable of producing an aggregate nitrogen (NOX) content ranging from about 1000 parts per million (ppm) to about 1400 parts per million (ppm).

Figure 3:
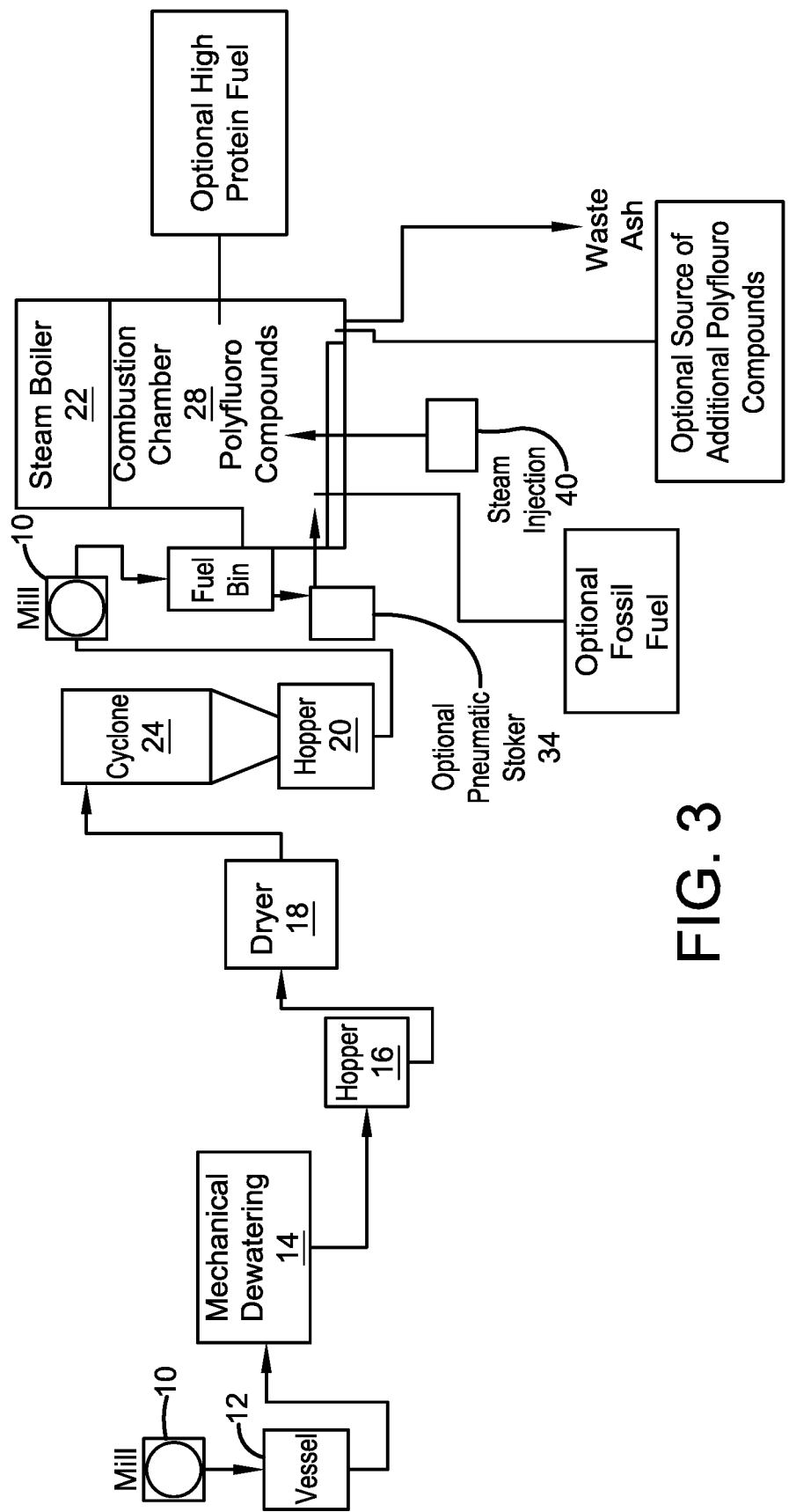
FIG. 3 illustrates an exemplary schematic flow diagram of a process for converting high protein organic materials, such as polyfluoro compounds and other materials, into a fuel.
Figure 4:
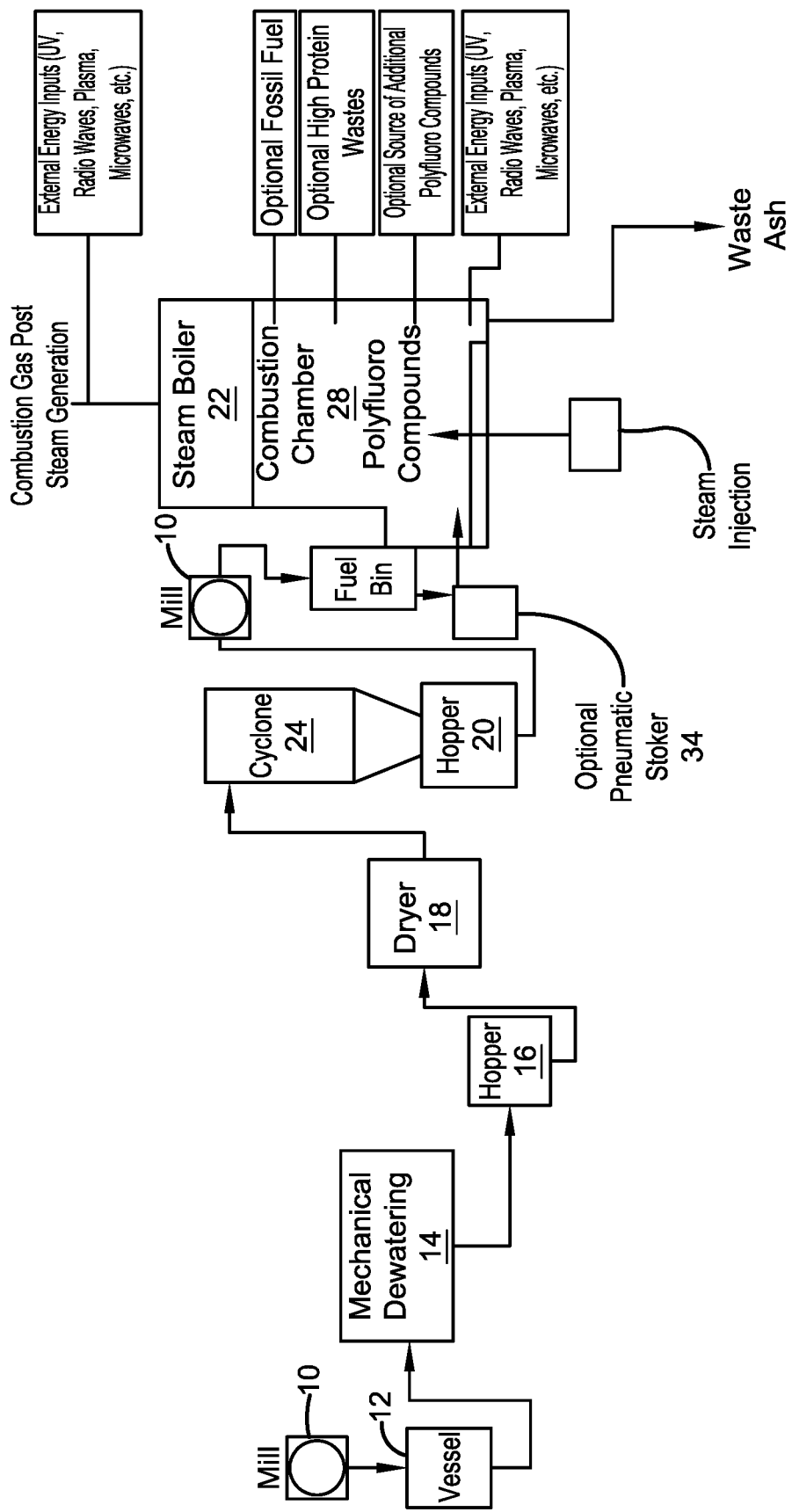
FIG. 4 illustrates an exemplary schematic flow diagram of a process which introduces external energy inputs for converting high protein organic materials into a fuel.

A general summary of the process for making a combustible fuel product from a high protein organic material that is non-auto-combustible is illustrated within FIGS. 2 to 4. First the high protein organic material is crushed or pulverized by a mill 10 to reduce the material to a finely ground particle size. The term "mill" is intended to include a roller mill, a hammer mill, any type of grinder and any type of particle reduction process that a person of ordinary person of skill in the art would utilize to reduce the particle size of materials. After pulverizing, the high protein organic material is moved to a vessel 12 and subsequently moved to a filter press 14 (or any mechanical water separator) where it is pressed to mechanically remove water and other liquids from the material. It is noted that any means known to those of skill in the art may be utilized to mechanically remove water and other liquids from the material. The high protein organic material is then moved to a hopper 16 by a pneumatic pump and subsequently subjected to a drier 18 to further remove water, liquid and moisture from the material. The high protein organic material is separated from the air vapor mixture by a cyclone 24, for example, and is then moved to a hopper 20. For combustion with the boiler 22 (e.g., a steam boiler), the high protein organic material is moved in a suitable manner from the fuel bin by a spraying device such as a pneumatic stoker (34) into the combustion chamber 28. In another process, steam is injected into the combustion chamber 28 from a steam generator 40 while simultaneously spraying high protein organic material within the combustion chamber. After combustion, waste ash is collected and disposed of. The above described process illustrated within FIGS. 2 to 4 for producing a combustible fuel product from a high protein organic material is intended to be a generalized description of the overall process. Moreover, the processes illustrated in FIGS. 3 and 4 include three ways in which polyfluoro compounds may be destroyed. First, high protein non-auto-combustible wastes having no PFAS present in them may be used to fuel the combustion chamber, while polyfluoro compounds may then be introduced into the fuel stream or directly into the chamber for destruction. Second, high protein non-auto-combustible wastes having PFAS present in them may be used to fuel a combustion chamber and additional polyfluoro compounds may be added to the fuel stream or directly into the chamber for destruction. Third, an existing combustion chamber being using conventional fuels for combustion may be used for PFAS destruction and high protein non-auto-combustible wastes may be introduced into the combustion environment to lower the need for the high combustion temperatures for PFAS typically required by the Environmental Protection Agency. Also, the use of a pneumatic stoker may be optional according to the processes illustrated in FIGS. 3 and 4 and may be replaced with a fluidized bed, advancing grate, agitating grate, etc.

In addition, FIG. 4 illustrates the possibility of introducing external energy inputs (e.g., ultraviolet radiation, radio waves, plasma, microwaves, etc.) either directly in the combustion chamber or in the exhaust gas stream downstream from the steam generator. With respect to the exhaust gas stream, hot combustion gasses pass through and exit the steam generator which acts as a heat exchanger. Accordingly, hot combustion gases exit the steam generator at a lower exhaust gas temperature. This results in the exhaust gas being cooled down to about 260 to 315° C. (about 500 to about 600° F.). At this temperature, the external energy input can produce ozone which is only capable of chemically surviving at these lower exhaust temperatures.

It is to be understood that variations, modifications, and rearrangements of the components shown within FIGS. 2 to 4 may be necessary such as in the case of producing a combustible fuel product from a high protein biological material from oil seed pulp meal as described within this document. For oil seed pulp meal, an extractor may be incorporated at the front end of the process to remove residue oils from the oil seed pulp meal before drying and subsequently pulverizing the oil seed pulp meal. Furthermore, because the drying and pulverizing steps may be optional with respect to oil seed pulp meal, it may not be necessary to include a mill 10 and/or a dryer 18 within the process in certain cases. It should be noted that with certain high protein organic materials, parts of the process described in FIG. 2 will not be necessary as the by-product may already be partially processed as received. For example, in the case of meat and bone meal, feathers, feather meal, oil seed pulp residue, all of these items may already be dried (pre-processed) to have or already have less than 10% moisture, eliminating the need for the Filter Press 14 and the Drier 18 (i.e., mechanical removal of moisture of these materials may not be necessary). Also, the process and order of steps described within FIG. 2 may vary depending on the type of high protein non-auto-combustible organic material that is being utilized. For example, with respect to biological waste material originating from waste-water treatment sludge, it may be necessary to first subject the biological waste material to a drier to reduce the moisture content before subjecting the biological waste material to a mill 10 for pulverization.

In further embodiments, by-products obtained from the combustion of the high protein organic material fuel products obtained from the processes described above may be utilized to convert or degrade hazardous compounds to less hazardous substances. Such hazardous compounds include but are not limited to polyfluoroalkyl compounds and perfluoralkyl compounds commonly referred to as PFAS. PFAS compounds may further include perfluorooctanoic acid (PFOA) and perfluorooctane sulfonate (PFOS). By-products obtained from the combustion of high protein organic material fuel products that are utilized in the conversion or degradation of such hazardous compounds include protein thermal decomposition by-products such as ammonium, nitrogenous hydrocarbons and nitrogen-based compounds including nitrogen oxides (NOX) and nitrogen free radicals. These protein thermal decomposition by-products remaining after combustion within the combustion chamber are harnessed for further combustion. In this process, polyfluoro compounds such as PFAS either present in the combustion chamber or added to the combustion chamber react with protein thermal decomposition by-products also present within the combustion chamber to mineralize fluorine from polyfluoro and organo fluorine compounds. The protein thermal decomposition by-products functions as a reactive species allowing for further combustion and incineration of PFAS. In one embodiment, as shown in FIG. 3, polyfluoro compounds are combusted within the combustion chamber 28. Optionally, a fossil fuel may be added to the combustion chamber.

The above-described process to convert or degrade hazardous compounds to less hazardous substances includes controlling higher concentrations of nitrogen oxides (NOX), CO, $CO_2$, nitrogenous/ammonium combustion by-products, nitrogen free radicals and other non-nitrogen containing free radical intermediate combustion reactants in the combustion gasses of the combustion of high protein organic material. The concentration of these combustion by-products within the combustion chamber is controlled to react and convert the carbon-fluoride bonds in PFAS compounds to nitrogen, carbon dioxide/carbon monoxide, hydrogen fluoride (HF) and various mineral fluoride salts based upon the cations available in the fuel. The cations present within the combustion chamber vary upon the type of high protein fuel used and typically include calcium, sodium, potassium, phosphorus, and many others at various concentrations. The combination of these by-products within further combustion reactions allows for the break-down and degradation of PFAS compounds. This break-down and degradation of PFAS compounds occurs more quickly and at lower temperatures than current processes for degrading PFAS compounds. For example, while incineration is an acceptable way to destroy PFAS compounds, it traditionally requires higher temperatures (i.e., temperatures above 999° C.) and/or high pressures and longer residence times of greater than one second. These parameters require more sophisticated equipment design and greatly increase the cost and specificity of the type of incineration equipment needed. The present process, in utilizing the high nitrogen content naturally present in high protein organic fuel by-products and excess water injected within the combustion chamber, takes advantage of a novel combustion environment created for the combustion of non-auto-combustible high protein organic materials to degrade PFAS compounds at lower temperatures (i.e., 999° C. or less) for shorter periods of time (i.e., less than 1 second) and lower pressures (i.e., close to atmospheric pressure). This novel combustion environment is not typically achieved or encountered due to the difficult nature of protein combustion. By controlling the excess water, carbon monoxide (CO), nitrogen oxides (NOX), nitrogenous/ammonium combustion by-products, nitrogen free radicals, other non-nitrogen containing free radical intermediate combustion reactants and minerals contained in ash, the incineration of PFAS as a subsequent step to the combustion of high protein organic materials can be optimized.

Examples of polyfluoro compounds used as reactants within the combustion chamber of the above-described process are provided in Table I below.

TABLE I

| | Compound name | Abbreviation | Type |
|---|---|---|---|
| PFAS | perfluorododecanoic acid | PFDoA | PFAS |
| | perfluoroundecanoic acid | | |
| | perfluorodecanoic acid | PFDA | PFAS |
| | perfluorononanoic acid | PFNA | PFAS |
| | perfluorooctanoic acid | PFOA | PFAS |
| | perfluoroheptanoic acid | PFHpA | PFAS |
| | perfluorohexanoic acid | PFHxA | PFAS |
| | Perfluoro-3,5-dioxahexanoic acid | PFO2HxA | |
| | perfluoropentanoic acid | PFPeA | PFAS |
| | perfluorobutanoic acid | PFBA | PFAS |
| | perfluoropropanoic acid | | PFAS |
| | trifluoroethanoic acid | TFA | PFAS |
| | Perfluoroethoxypropyl carboxylic acid | PEPA | PFAS |
| | perfluorooctanesulfonic acid | PFOS | PFAS |
| | perfluoroheptanesulfonic acid | | PFAS |
| | perfluorohexanesulfonic acid | PFHxS | PFAS |
| | perfluoropentanesulfonic acid | | PFAS |
| | perfluorobutanesulfonic acid | PFBS | PFAS |
| | perfluoropropanesulfonic acid | | PFAS |
| | trifluoroethanesulfonic acid | | PFAS |
| | trifluoromethanesulfonic acid (triflic acid) | | PFAS |
| | Nonafluorobutanesulfonyl fluoride | NfF | PFAS |
| | N-ethyl perfluorooctanesulfonamide | | |
| | N-ethyl-perfluorooctanesulfonoamidoethanol | | PFAS |
| | ammonium salt of hexafluoropropylene oxide dimer acid | GenX | PFAS |
| | Perfluoro-2-methoxyacetic acid | PFMOAA | 2,2-Difluoro-2-(trifluoromethoxy)acetic acid |
| | Heptafluoropropyl 1,2,2,2-tetrafluoroethyl ether | E1 (GenX byproduct) | 1,1,1,2,2,3,3-Heptafluoro-3-(1,2,2,2-tetrafluoroethoxy)propane |
| | hexafluoropropylene oxide dimer acid | HFPO-DA | PFAS |
| | Perfluorooctanesulfonamide | FOSA/PFOSA | 1,1,2,2,3,3,4,4,5,5,6,6,7,7,8,8,8-Heptadecafluoro-1-octanesulfonamide |

TABLE I-continued

| | Compound name | Abbreviation | Type |
|---|---|---|---|
| | Perfluoro-3,5,7-trioxaoctanoic acid | PFO3OA | 2-[[Difluoro(trifluoromethoxy)methoxy]difluoromethoxy]-2,2-difluoroacetic acid |
| | Perfluoro-3,5,7,9-tetraoxadecanoic acid | PFO4DA | 2,2,4,4,6,6,8,8,10,10,10-Undecafluoro-3,5,7,9-tetraoxadecanoic acid |
| | Perfluoro-3,5,7,9,11-pentaoxadodecanoic acid | PFO5DoDA | C7HF13O7 |
| | Perfluorooctane sulfonamidoethanol-based phosphate (SAmPAP) esters | SAmPAP diester | |
| | Chlorodifluoroacetic acid | CDFA | |
| | fluorinated acrylics | | |
| | Nafion byproduct 1 | C7HF13O5S | |
| | Nafion byproduct 2 | C7H2F14O5S | 2-[1-[Difluoro(1,2,2,2-tetrafluoroethoxy)methyl]-1,2,2,2-tetrafluoroethoxy]-1,1,2,2-tetrafluoroethanesulfonic acid |
| | Nafion byproduct 4 | C7H2F12O6S | |
| | 2,2,3,3-tetrafluoro-3-((1,1,1,2,3,3-hexafluoro-3-(1,2,2,2-tetrafluoroethoxy)propan-2-yl)oxy)propanoic acid | Hydro-EVE | C8H2F14O4 |
| | Perfluoromethoxypropyl carboxylic acid | PMPA | C4HF7O3 |
| | 1,1,2,2-tetrafluoro-2-(1,2,2,2-tetrafluoro-ethoxy)ethane sulfonate | NVHOS | C4H2F8O4S |
| Gases/Refrigerants | Carbon tetrafluoride | CF4 | Gas |
| | 1,1,1,2-Tetrafluoroethane | R-134a | gas |
| | Difluoromethane | CH2F2 | R-32 |
| | fluoromethane | CH3F | Freon 41 |
| | Fluoroform | CHF3 | R-23 |
| | 1,1,1,2-Tetrafluoroethane | | R-134a |
| | pentafluoroethane | | R-125 |
| | Mixture of R-32 and R-125 | | R-410A |
| | 2,3,3,3-Tetrafluoropropene | | R-1234yf |
| | 1,3,3,3-Tetrafluoropropene | | |
| | 1-Chloro-3,3,3-trifluoropropene | | |
| | 1,1-Dichloro-1-fluoroethane | | |
| | Trichlorofluoromethane | CFC-11 | Freon 11 |
| | Dichlorodifluoromethane | CFC-12 | Freon 12 |
| | 1,1,2-Trichloro-1,2,2-trifluoroethane | CFC-113 | |
| | 1,2-Dichlorotetrafluoroethane | CFC-114 | Cryoflurane |
| | Chloropentafluoroethane | CFC-115 | |
| | Bromochlorodifluoromethane | halon 1211 | |
| | Bromotrifluoromethane | halon 1301 | |
| | 1,2-dibromotetrafluoroethane | halon 2402 | |
| | Chloro(trifluoro)methane | CFC-13 | Freon 13 |
| | Pentachlorofluoroethane | CFC-111 | |
| | 1,1,2,2-Tetrachloro-1,2-difluoroethane | CFC-112 | |
| | 1,1,1,2,2,3,3-Heptachloro-3-fluoropropane | CFC-211 | |
| | Hexachlorodifluoropropane | CFC-212 | |
| | 1,1,1,3,3-Pentachloro-2,2,3-trifluoropropane | CFC-213 | |
| | 1,2,2,3-Tetrachloro-1,1,3,3-tetrafluoropropane | CFC-214 | |
| | 1,1,1-Trichloro-2,2,3,3,3-pentafluoropropane | CFC-215 | |
| | 1,2-Dichloro-1,1,2,3,3,3-hexafluoropropane | CFC-216 | |
| | 1-Chloro-1,1,2,2,3,3,3-heptafluoropropane | CFC-217 | |
| | 1,1-Dichloro-1-fluoroethane | HCFC-141b | |
| | Dichlorofluoromethane | HCFC-21 | R-21 |
| | Chlorodifluoromethane | HCFC-22 | R-22 |
| | Chlorofluoromethane | HCFC-31 | |
| | 1,1,1,2-Tetrachloro-2-fluoroethane | HCFC-121 | |
| | 1,1,2-Trichloro-2,2-difluoroethane | HCFC-122 | |
| | 2,2-Dichloro-1,1,1-trifluoroethane | HCFC-123 | |
| | 1-Chloro-1,2,2,2-tetrafluoroethane | HCFC-124 | |
| | 1,1,2-Trichloro-2-fluoroethane | HCFC-131 | |
| | Dichlorodifluoroethane | HCFC-132 | |
| | 1-Chloro-1,2,2-Trifluoroethane | HCFC-133 | |
| | 1,2-Dichloro-1-fluoroethane | HCFC-141 | |
| | 1-Chloro-1,2-difluoroethane/1-Chloro-1,1-difluoroethane | HCFC-142 | |
| | 1,1,1,2,2,3-Hexachloro-3-fluoropropane | HCFC-221 | |
| | Pentachlorodifluoropropane | HCFC-222 | |
| | Tetrachlorotrifluoropropane | HCFC-223 | |
| | Trichlorotetrafluoropropane | HCFC-224 | |
| | Dichloropentafluoropropane | HCFC-225 | |
| | Chlorohexafluoropropane | HCFC-226 | |
| | Pentachlorofluoropropane | HCFC-231 | |
| | Tetrachlorodifluoropropane | HCFC-232 | |
| | Trichlorotrifluoropropane | HCFC-233 | |
| | Dichlorotetrafluoropropane | HCFC-234 | |
| | Chloropentafluoropropane | HCFC-235 | |

TABLE I-continued

| | Compound name | Abbreviation | Type |
|---|---|---|---|
| | Tetrachlorofluoropropane | HCFC- 241 | |
| | Trichlorodifluoropropane | HCFC- 242 | |
| | Dichlorotrifluoropropane | HCFC- 243 | |
| | Chlorotetrafluoropropane | HCFC- 244 | |
| | Trichlorofluoropropane | HCFC- 251 | |
| | Dichlorodifluoropropane | HCFC- 252 | |
| | Chlorotrifluoropropane | HCFC- 253 | |
| | Dichlorofluoropropane | HCFC- 261 | |
| | Chlorodifluoropropane | HCFC-262 | |
| | Chlorofluoropropane | HCFC-271 | |
| Polymers | Polytetrafluoroethylene | PTFE | |
| | Polyvinylfluoride | PVF | |
| | polyvinylidene fluoride | PVDF | |
| | polychlorotrifluoroethylene | PCTFE | |
| | Nafion | C7HF13O5S•C2F4 | Various formulas |
| | perfluoroalkoxy polymer | PFA | |
| | fluorinated ethylene-propylene | FEP | |
| | polyethylenetetrafluoroethylene | ETFE | |
| | polyethylenechlorotrifluoroethylene | ECTFE | |
| | Viton | FKM? | |
| | Tetrafluoroethylene propylene | FEPM | |
| | Perfluoropolyether | PFPE | Krytox |
| Monomers/fluorotelomer | Hexafluoropropylene oxide | HFPO | |
| | Hexafluoropropylene oxide trimer acid | HFPO-TA | |
| | tetrafluoroethylene | TFE | PTFE precursor |
| Fluorotelomer | perfluoroethyl iodide | CF3CF2I | |
| | perfluoroalkyl iodide | | |
| | Telomer alcohol | | |
| | Telomer thiol | | |
| | Telomer olefin | | |
| | Polymeric products and non-reacted reactants | | |
| | 1,1-Difluoroethylene | | |
| | 6:2 Fluorotelomer sulfonic acid | 6:2 FTSA | 3,3,4,4,5,5,6,6,7,7,8,8,8-Tridecafluoro-1-octanesulfonic acid |
| | 6:2 Fluorotelomer alcohol | 6:2 FTOH | 3,3,4,4,5,5,6,6,7,7,8,8,8-Tridecafluoro-1-octanol |
| | 6:2 Fluorotelomer sulfonamide alkylbetaine | 6:2 FTAB | N-(Carboxymethyl)-N,N-dimethyl-3-[[(3,3,4,4,5,5,6,6,7,7,8,8,8-tridecafluorooctyl)sulfonyl]amino]-1-propanaminium, inner salt |
| | 6:2 Fluorotelomer carboxylic acid | 6:2 FTCA | 3,3,4,4,5,5,6,6,7,7,8,8,8-Tridecafluorooctanoic acid |
| | 5:3 Fluorotelomer carboxylic acid | 5:3 FTCA | 4,4,5,5,6,6,7,7,8,8,8-Undecafluorooctanoic acid |
| | 8:2 Fluorotelomer sulfonic acid | 8:2 FTSA | 3,3,4,4,5,5,6,6,7,7,8,8,9,9,10,10,10-Heptadecafluoro-1-decanesulfonic acid |
| | 8:2 Fluorotelomer alcohol | 8:2 FTOH | 3,3,4,4,5,5,6,6,7,7,8,8,9,9,10,10,10-Heptadecafluoro-1-decanol |
| Fluorinated end PFOS | Perfluorooctanesulfonyl fluoride | PFOSF | |
| | perfluorohexanesulfonyl fluoride | | |
| | perfluorodecanesulfonyl fluoride | | |
| Pesticides | N-Ethyl-1,1,2,2,3,3,4,4,5,5,6,6,7,7,8,8,8-heptadecafluoro-1-octanesulfonamide | Sulfuramid | CAS #: 4151-50-2 |
| Pharmaceuticals | Isoflurane | | |
| | Sevoflurane | | |
| | Desflurane | | |
| | Droperidol | | |
| | Enflurane | | |
| | Flumazenil | | |
| | Halophane | | |
| | Methoxyflurane | | |
| | Midazolam | | |
| | Citalopram | | |
| | Escitalopram | | |
| | Fluoxetine HCl | | |
| | Fluvoxamine maleate | | |
| | Paroxetine | | |
| | Progabide | | |
| | Fluticasone propionate | | Bioaccumlative |
| | Dexamethasone | | |
| | fluoroquinolones | | e.g. Ciprofloxacin |
| Proprietary | 3M Novec ™ Fluorosurfactant FC-4430 | | 3M - St. Paul, MN |
| | 3M Novec ™ Fluorosurfactant FC-4432 | | 3M - St. Paul, MN |

TABLE I-continued

|  | Compound name | Abbreviation | Type |
|---|---|---|---|
| AFFF | 6:2 Chlorinated polyfluorinated ether sulfonate | "F-35B" | CAS #: 73606-19-6 |
|  | 3H-Perfluoro-3-[(3-methoxy-propoxy)propanoic acid], ammonium salt | "ADONA" | CAS #: 958445-44-8 |
|  | OMNOVA PolyFox PF-159 |  | Omnova - Beachwood, OH |
|  | OMNOVA PolyFox . . . |  | Omnova - Beachwood, OH |
|  | Chemguard S-111 |  | Chemguard - Marinette, WI |
|  | Chemguard S-151 |  | Chemguard - Marinette, WI |
|  | Chemguard S-103A |  | Chemguard - Marinette, WI |
|  | Chemguard S-106A |  | Chemguard - Marinette, WI |
|  | Chemguard S-216M |  | Chemguard - Marinette, WI |
|  | Chemguard S-228M |  | Chemguard - Marinette, WI |
|  | Chemguard S-208M |  | Chemguard - Marinette, WI |
|  | Chemguard S-500 |  | Chemguard - Marinette, WI |
|  | Chemguard S-550 |  | Chemguard - Marinette, WI |
|  | Chemguard S-550-100 |  | Chemguard - Marinette, WI |
|  | Chemguard S-554 |  | Chemguard - Marinette, WI |
|  | Chemguard S-554-100 |  | Chemguard - Marinette, WI |
|  | Chemguard S-559 |  | Chemguard - Marinette, WI |
|  | Chemguard S-559-100 |  | Chemguard - Marinette, WI |
|  | Chemguard S-760P |  | Chemguard - Marinette, WI |
|  | Chemguard S-761P |  | Chemguard - Marinette, WI |
|  | Chemguard S-764P |  | Chemguard - Marinette, WI |
|  | Chemguard S-764P-14A |  | Chemguard - Marinette, WI |
|  | Chemguard S-761P-100 |  | Chemguard - Marinette, WI |
|  | Chemguard C335 3% × 3% AR-AFFF |  | Chemguard - Marinette, WI |
|  | Chemguard C334-LV 3% × 3% AR-AFFF, Low Viscosity |  | Chemguard - Marinette, WI |
|  | Chemguard C364 3% × 6% AR-AFFF |  | Chemguard - Marinette, WI |
|  | Chemguard C137 1% × 3% AR-AFFF |  | Chemguard - Marinette, WI |
|  | Chemguard C137-LT18 1% × 3% AR-AFFF, Low Temperature |  | Chemguard - Marinette, WI |
|  | Chemguard C337-LT13 3% × 3% AR-AFFF, Low Temperature |  | Chemguard - Marinette, WI |
|  | Chemguard C1B 1% AFFF |  | Chemguard - Marinette, WI |
|  | Chemguard C1B-LT29 1% AFFF, Low Temperature |  | Chemguard - Marinette, WI |
|  | Chemguard C306-MS 3% Military Spec AFFF |  | Chemguard - Marinette, WI |
|  | Chemguard C606-MS 6% Military Spec AFFF |  | Chemguard - Marinette, WI |
|  | Chemguard C3B 3% AFFF |  | Chemguard - Marinette, WI |
|  | Chemguard C3B-LT29 3% AFFF, Low Temperature |  | Chemguard - Marinette, WI |
|  | Chemguard C6B 6% AFFF |  | Chemguard - Marinette, WI |
|  | Chemguard C3IC1 3% AFFF, ICAO C |  | Chemguard - Marinette, WI |
|  | Chemguard C3IB2 3% AFFF, ICAO B |  | Chemguard - Marinette, WI |
|  | Chemguard C6IC1 6% AFFF, ICAO C |  | Chemguard - Marinette, WI |
|  | Chemguard C6IB2 6% AFFF, ICAO B |  | Chemguard - Marinette, WI |
|  | Capstone ™ FS-51 |  | Amphoteric fluorosurfactant - Chemours - Wilmington, DE |
|  | Zonyl ® 1033D |  | Sigma Aldrich - St. Louis, MO |
|  | Foraperle ® 225 |  | DuPont - Wilmington, DE |

Examples of compounds resulting from the reaction of polyfluoro compounds within the combustion chamber are provided within Table II below.

TABLE II

| Class | Compound name | Abbreviation | Phase at 1600 F. | Notes |
|---|---|---|---|---|
| HF | Hydrogen fluoride | HF | Gas | toxic |
| From Ash Analysis | Calcium fluoride | CaF2 | Solid |  |
| ↓ | Silicon tetrafluoride | SiF4 | Gas |  |
|  | Aluminum fluoride | AlF3 | Solid |  |
|  | Titanium (III) trifluoride | TiF3 | Solid |  |
|  | Titanium (IV) tetrafluoride | TiF4 | Liquid |  |
|  | Iron (III) fluoride | FeF3 | Solid |  |
|  | Magnesium fluoride | MgF2 | Solid |  |
|  | Potassium fluoride | KF | Liquid |  |
|  | Sodium fluoride | NaF | Solid |  |
|  | Sulfur hexafluoride | SiF6 | Gas | Unstable |
|  | Sulfur decafluoride | S2F10 | Gas | Unstable |
|  | Sulfur tetrafluoride | SF4 | Gas | Unstable |
|  | Sulfur difluoride | SF2 | Gas | Unstable |
|  | Disulfur difluoride | S2F2 | Gas | Unstable |
|  | Disulfur tetrafluoride | S2F4 | Gas | Unstable |

TABLE II-continued

| Class | Compound name | Abbreviation | Phase at 1600 F. | Notes |
|---|---|---|---|---|
| | Phosphorus trifluoride | PF3 | Gas | toxic |
| | Phosphorus pentafluoride | PF5 | Gas | toxic |
| | Diphosphorus tetrafluoride | P2F4 | Gas | |
| | Strontium (II) fluoride | SrF2 | Solid | |
| | Barium fluoride | BaF2 | Solid | |
| | Manganese (II) fluoride | MnF2 | Liquid | |
| | Manganese (III) fluoride | MnF3 | Decomposed | |
| | Manganese (IV) fluoride | MnF4 | Decomposed | |
| Minerals | Fluoroapatite | Ca5FO12P3 | | |
| | Acuminite | SrAlF4(OH)•(H2O) | | |
| | Artroeite | PbAlF3(OH)2 | | |
| | Baraite (ammonium fluorosilicate) | (NH4)2SiF6 | Decomposed to HF and SiF6 | |
| | Bultfonteinite | Ca2SiO2F4 | | |
| | Creedite | Ca3Al2SO4F10 | | |
| | Cryolite | Na3AlF6 | Solid | |
| | Fluorocaphite | (Ca, Sr, Ce, Na)5(PO4)3F | | |
| | Kogarkoite | Na3SO4F | | |
| | Neighborite | NaMgF3 | | |
| | Sonolite | Mn9(SiO4)4F2 | | |
| | Thomsenolite | NaCaAlF6•H2O | | |
| | Wagnerite | (Mg, Fe)2PO4F | | |
| | Zharchikhite | AlF(OH)2 | | |
| Other elements ↓ | Zinc fluoride | ZnF2 | Solid | |
| | Beryllium fluoride | BeF2 | Liquid | |
| | Lithium fluoride | LiF | Liquid | |
| | Rubidium fluoride | RbF | Liquid | |
| | Cesium fluoride | CsF | Liquid | |
| | Radium fluoride | RaF2 | | |
| | Zirconium (IV) fluoride | ZrF4 | Solid | |
| | Mercury (II) fluoride | HgF2 | | |
| | Silver (I) fluoride | AgF | Liquid | |
| | Copper (II) fluoride | CuF2 | Liquid | |
| | Nickel (II) fluoride | NiF2 | Solid | |
| | Chromium (II) fluoride | CrF2 | Solid | oxidizes in air |
| | Chromium (III) fluoride | CRF3 | Solid | |
| | Cobalt (II) fluoride | CoF2 | Solid | |
| | Vanadium (III) fluoride | VF3 | Solid | |
| | Vanadium (IV) fluoride | VF4 | | Decomposes at 325 C. |
| | Scandium (III) fluoride | ScF3 | Solid | |
| | Boron trifluoride | BF3 | Gas | Will hydrolyze to HF |
| | Gallium (III) fluoride | GaF3 | Liquid | |
| | Platinum tetrafluoride | PtF4 | Liquid | |
| | Cadmium fluoride | CdF2 | Solid | |
| | Molybdenum (IV) fluoride | MoF4 | | |
| | Molybdenum (V) fluoride | MoF5 | | |
| | Molybdenum (III) fluoride | MoF3 | Solid | |
| | Tantalum (V) fluoride | TaF5 | | Decomposes |
| | Palladium (II) fluoride | PdF2 | Solid | |
| | Palladium (II, IV) fluoride | PdF3 | Solid | |
| | Gold (III) fluoride | AuF3 | Gas | Reactive |
| | Tin (II) fluoride | SnF2 | Gas | |
| | Tin (IV) fluoride | SnF4 | | Liquid |
| | Lead tetrafluoride | PbF4 | | Liquid |
| | Bismuth (III) fluoride | BiF3 | | Liquid |
| | Cerium (III) trifluoride | CeF3 | Solid | |

Although certain specific steps and devices for performing the steps of the process of the present disclosure have been disclosed above, it will be apparent to one of ordinary skill in the art that other steps and devices may be used without departing from the scope of the present disclosure indicated in the appended claims. It will also be apparent that the present disclosure may be applied to other types of high protein non-auto-combustible organic materials. It will also be apparent that the present disclosure may be applied to other processes, in addition to those disclosed herein. For example, in addition to Brewers Spent Grains (termed BDG in the art) described above, the present disclosure may be applied to Distillers Spent Grain (DDG) and any fermentation process of grains that produce alcohol.

We claim:
1. A process for converting hazardous polyfluoro compounds to less hazardous substances comprising the following steps:
Pre-Combustion Steps
 1) Providing a non-auto-combustible organic material, wherein the organic material is a high protein organic material having a protein content of about 10% to about 20%, on a dry weight basis (DWB);
 2) Mechanically removing liquid and soluble components from the high protein organic material and combustion targeted components;
 3) Applying heat to dry the organic material and combustion targeted components to reduce its moisture content to ten percent (10%) or less by weight;

4) Pulverizing the high protein organic material to obtain a reduced particle size of the high protein organic material, wherein the pre-combustion steps of 2) mechanically removing liquid and soluble components from the high protein organic material and combustion components, 3) applying heat to dry the organic material and combustion components to reduce its moisture content to ten percent (10%) or less by weight and, 4) pulverizing the high protein organic material to reduce the high protein organic material to a particle size of less than 2 mm may occur in any order;

5) Separating particles of the high protein organic material during a combustion phase to inhibit their cohesion into an integrated mass by spraying the particles into a combustion chamber;

6) Optionally, drying combustion air and injecting dehydrated combustion air having a moisture content of less than 1,000 parts per million (ppm) into a first zone of the combustion chamber;

7) Injecting steam in a controlled manner into a second zone of the combustion chamber to enhance combustion characteristics of the high protein organic material;

8) Allowing protein thermal decomposition by-products to react with nitrogen oxides (NOX) within the combustion chamber to form water ($H_2O$) and nitrogen ($N_2$);

wherein aggregate nitrogen oxide (NOX) production ranges from about 100 parts per million (ppm) to about 350 parts per million (ppm);

wherein protein thermal decomposition by-products remaining after or produced during combustion include ammonium, nitrogenous hydrocarbons, sulfur oxides (SOX), carbon monoxide (CO), hydrogen ions (H+), hydroxide ions ($OH^-$), ozone ($O_3$) carbon dioxide ($CO_2$), nitrogen oxides (NOX), nitrogen free radicals, nitrogen cations, nitrogen anions, oxygen free radicals, hydrogen free radicals, carbon free radicals, silicone free radicals, sulfur free radicals, phosphorous free radicals, metal free radicals comprising metal cations, wherein the metal cations comprise at least one of calcium, sodium, potassium, phosphorus, silica, manganese, aluminum, titanium, iron, magnesium, sulfur, strontium, ammonium, lithium, rubidium, cesium, radium, zirconium, mercury, silver, copper, nickel, chromium, cobalt, vanadium, scandium, boron, gallium, platinum, cadmium, molybdenum, tantalum, palladium, gold, tin, lead, bismuth, cerium, beryllium, and barium in the combustion gasses;

9) Controlling protein thermal decomposition by-products produced during combustion within the combustion chamber including nitrogen oxide (NOX) production, sulfur oxide (SOX) production, hydrogen ion (H+) production, hydroxide ion ($OH^-$) production, ozone ($O_3$) production, nitrogen free radicals, nitrogen cations, nitrogen anions, oxygen free radicals, hydrogen free radicals, carbon free radicals, silicone free radicals, sulfur free radicals, phosphorous free radicals, metal free radicals comprising metal cations, wherein the metal cations comprise at least one of calcium, sodium, potassium, phosphorus, silica, manganese, aluminum, titanium, iron, magnesium, sulfur, strontium, ammonium, lithium, rubidium, cesium, radium, zirconium, mercury, silver, copper, nickel, chromium, cobalt, vanadium, scandium, boron, gallium, platinum, cadmium, molybdenum, tantalum, palladium, gold, tin, lead, bismuth, cerium beryllium, barium and carbon monoxide (CO) production;

10) Combusting the processed non-auto-combustible high protein organic material and incinerating polyfluoro compound impurities which may be present or may be added within the processed non-auto-combustible high protein organic material in the combustion chamber at a temperature of less than 1,400° C. and/or adding polyfluoro compounds as an additive to a traditional fuel within the combustion chamber to be incinerated with the combustion of non-auto-combustible high protein organic material at a temperature of less than 1,400° C., wherein the protein thermal decomposition by-products functions as a reactive species to incinerate polyfluoro compounds to degrade hazardous polyfluoro compounds into less hazardous substances.

2. The process defined in claim 1, wherein the step of applying heat to dry the organic material and combustion targeted components reduces the moisture content of the organic material and combustion targeted components to five percent (5%) or less by weight.

3. The process defined in claim 1, wherein the step of pulverizing the high protein organic material reduces the size of the high protein organic material to a particle size of 2 mm or less.

4. The process defined in claim 3, wherein the step of combusting the processed non-auto-combustible high protein organic material and incinerating polyfluoro compound impurities present within the processed non-auto-combustible high protein organic material in the combustion chamber at a temperature of about 1,000° C. and/or adding polyfluoro compounds within the combustion chamber to be incinerated with the combustion of non-auto-combustible high protein organic material at a temperature of about 1,000° C.

5. The process defined in claim 1, wherein the combustion air is dehydrated with desiccants or refrigerated driers prior to introduction into the combustion chamber.

6. The process defined in claim 1, further comprising introducing high energy ultra-violet light into the combustion gas mixture either directly into the combustion gas chamber or downstream from the combustion gas chamber in the exhaust gases to initiate free radical development in the lower temperature zones of a steam boiler operation.

7. The process defined in claim 6, wherein the high energy ultra-violet light is introduced through industrial lamps and quartz lenses.

8. The process defined in claim 1, further comprising introducing microwaves, radio frequencies and plasma energy into the combustion gas mixture either directly into the combustion gas chamber or downstream from the combustion gas chamber after the combustion gas mixture has cooled.

9. The process defined in claim 1, wherein protein decomposition by-product exhaust gas resulting from the combustion of high protein organic materials contains nitrogen oxide (NOX), sulfur oxide (SOX), carbon monoxide (CO), carbon dioxide ($CO_2$), hydrogen ions (H+), hydroxide ions ($OH^-$), ozone ($O_3$), nitrogen free radicals, nitrogen cations, nitrogen anions, oxygen free radicals, hydrogen free radicals, carbon free radicals, silicone free radicals, sulfur free radicals, phosphorous free radicals, metal free radicals whose metal cations comprise at least one of calcium, sodium, potassium, phosphorus, silica, manganese, aluminum, titanium, iron, magnesium, sulfur, strontium, ammonium, lithium, rubidium, cesium, radium, zirconium, mercury, silver, copper, nickel, chromium, cobalt, vanadium, scandium, boron, gallium, platinum, cadmium, molybdenum, tantalum, palladium, gold, tin, lead, bismuth, cerium, beryllium, and barium, wherein the protein decomposition by-product exhaust gas resulting from the combustion of high protein organic materials contains an aggregate range of about 100 to about 350 ppm nitrogen oxides, wherein the protein decomposition by-product exhaust gas resulting from the combustion of high protein organic materials contains an aggregate range of from 0 to about 25 ppm sulfur oxides, contains an aggregate range from about 10 to about 100 ppm carbon monoxide and wherein the protein decomposition by-product exhaust gas and ash resulting from the combustion of high protein organic materials also contain mineral cations that react with fluorine.

10. The process defined in claim 1, wherein the steps of pulverizing, mechanically removing liquid, applying heat to dry the high protein organic material particles, spraying particles into the combustion chamber and injecting steam into the combustion chamber degrades the proteins contained within the particles and denatures them by allowing nitrogen cross-linking and other cross-linking reactions to occur within the particles, allowing the particles to complete all of the cross-linking ability before the particles contact other particles.

11. The process defined in claim 10, wherein cross-linking of the high protein organic material particles is prevented by prematurely initiating cross-linking reactions of the nitrogen bonds and other cross linking reactions while the particles are being agitated and wherein the high protein organic material particles no longer adhere to each other, thereby arresting the particles tendency to adhere to each other within the combustion chamber via nitrogen bond cross-linkage and other cross-linkage reactions.

12. The process defined in claim 11, wherein the step of separating the high protein organic material by spraying the processed high protein organic material into the combustion chamber is effected through use of a pneumatic stoker.

13. The process defined in claim 12, wherein spraying the particles of the high protein organic material into the combustion chamber by the pneumatic stoker keeps the particles separated in the combustion chamber long enough to allow heat transfer provided by the combustion process to quickly dry and then degrade proteins present within the high protein organic material and to prevent nitrogen cross linking and other cross linking reactions between the particles that would have the particles adhere to each other, wherein the particles of the high protein organic material are separated and dispersed within the combustion chamber and ignited and burned while in suspension and separated from each other before they land and adhere to each other.

14. The process defined in claim 1, wherein the polyfluoro compound impurities and polyfluoro compounds comprise polyfluoroalkyl and perfluoralkyl substances (PFAS), and organic fluoride (organo fluorine) compounds, wherein the PFAS substances further comprise perfluorooctanoic acid (PFOA) and perfluorooctane sulfonate (PFOS).

15. The process of claim 1, further comprising controlling the concentration of ammonium, nitrogenous hydrocarbons, carbon monoxide (CO), carbon dioxide ($CO_2$), nitrogen oxides (NOX), sulfur oxides (SOX), hydrogen ions (H+), hydroxide ions (OH−), ozone ($O_3$), nitrogen cations, nitrogen free radicals, oxygen free radicals, hydrogen free radicals, carbon free radicals, silicone free radicals, sulfur free radicals, phosphorous free radicals, metal free radicals whose metal cations comprise at least one of calcium, sodium, potassium, phosphorus, silica, manganese, aluminum, titanium, iron, magnesium, sulfur, strontium, ammonium, lithium, rubidium, cesium, radium, zirconium, mercury, silver, copper, nickel, chromium, cobalt, vanadium, scandium, boron, gallium, platinum, cadmium, molybdenum, tantalum, palladium, gold, tin, lead, bismuth, cerium beryllium, and barium in the combustion gasses within the combustion chamber, wherein the concentration of protein thermal decomposition by-products and excess water or moisture within the combustion chamber is controlled to react and convert carbon-fluoride bonds in PFAS compounds to carbon dioxide/carbon monoxide, hydrogen fluoride (HF) and various inorganic fluoride containing salts and/or minerals.

16. The process of claim 1, wherein the incineration of PFAS compounds within the combustion chamber has a residence time of 1 second or less at a temperature below 1,400° C. and at a temperature of about 1,000° C.

17. The process of claim 9, wherein mineral cations and concentrations of mineral cations present within the combustion chamber after combustion of the high protein organic material vary upon the type of high protein fuel used for combustion and comprise at least one of calcium, sodium, potassium, phosphorus, silica, manganese, aluminum, titanium, iron, magnesium, sulfur, strontium, ammonium, lithium, rubidium, cesium, radium, zirconium, mercury, silver, copper, nickel, chromium, cobalt, vanadium, scandium, boron, gallium, platinum, cadmium, molybdenum, tantalum, palladium, gold, tin, lead, bismuth, cerium, beryllium, and barium.

18. The process defined in claim 17, wherein PFAS substances are degraded to an inorganic mineralized form.

19. The process defined in claim 18, wherein PFAS substances are degraded to at least one of calcium fluoride ($CaF_2$) hydrogen fluoride (HF), silicon tetrafluoride ($SiF_4$), aluminum fluoride ($AlF_3$), titanium (III) trifluoride ($TiF_3$), titanium (IV) tetrafluoride (TiF4), iron (III) fluoride ($FeF_3$), magnesium fluoride ($MgF_2$), potassium fluoride (KF), sodium fluoride (NaF) sulfur hexafluoride ($SiF_6$), sulfur decafluoride ($S_2F_{10}$), sulfur tetrafluoride ($SF_4$), sulfur difluoride ($SF_2$), disulfur difluoride ($S_2F_2$), disulfur tetrafluoride ($S_2F_4$), phosphorus trifluoride ($PF_3$), phosphorus pentafluoride ($PF_5$), diphosphorus tetrafluoride ($P_2F_4$), strontium (II) fluoride ($SrF_2$), barium fluoride ($BaF_2$), manganese (II) fluoride ($MnF_2$), manganese (III) fluoride ($MnF_3$), manganese (IV) fluoride ($MnF_4$), fluorapatite ($Ca_5FO_{12}P_3$), acuminite ($SrAlF_4(OH)\cdot(H_2O)$), artroeite ($PbAlF_3(OH)_2$), baraite (ammonium fluorosilicate) ($NH_4)_2SiF_6$, bultfonteinite ($Ca_2SiO_2)F_4$, creedite ($Ca_2SiO_2F_4$), cryolite ($Na_3AlF_6$), fluorocaphite (Ca, Sr, Ce, Na)$_5$(PO$_4$)$_3$F, kogarkoite ($Na_3SO_4F$), neighborite ($NaMgF_3$), sonolite ($Mn_9(SiO_4)_4F_2$, thomsenolite ($NaCaAlF_6\cdot H_2O$), wagnerite (Mg, Fe)$_2$PO$_4$F), zharchikhite ($AlF(OH)_2$, zinc fluoride ($ZnF_2$), beryllium fluoride ($BeF_2$), lithium fluoride (LiF), rubidium fluoride (RbF), cesium fluoride (CsF), radium fluoride ($RaF_2$), zirconium (IV) fluoride ($ZrF_4$) mercury (II) fluoride ($HgF_2$), silver (I) fluoride (AgF), copper (II) fluoride ($CuF_2$), nickel (II) fluoride ($NiF_2$), chromium (II) fluoride ($CrF_2$), chromium (III) fluoride ($CrF_3$), cobalt (II) fluoride ($CoF_2$), vanadium (III) fluoride ($VF_3$), vanadium (IV) fluoride ($VF_4$), scandium (III) fluoride ($ScF_3$), boron trifluoride ($BF_3$), gallium (III) fluoride ($GaF_3$), platinum tetrafluoride ($PtF_4$), cadmium fluoride ($CdF_2$), molybdenum (IV) fluoride ($MoF_4$), molybdenum (V) fluoride ($MoF_5$), molybdenum (III) fluoride ($MoF_3$), tantalum (V) fluoride ($TaF_5$), palladium (II) fluoride ($PdF_2$), palladium (II, IV) fluoride (PdF$_3$), gold (III) fluoride (AuF$_3$), tin (II) fluoride (SnF$_2$), tin (IV) fluoride (SnF$_4$), lead tetrafluoride (PbF$_4$), bismuth (III) fluoride (BiF$_3$), and cerium (III) trifluoride (CeF$_3$).

20. The process defined in claim 1, wherein the high protein organic material is one or more of the following: a biological waste or by-product material, wherein the biological waste or by-product material originates from wastewater treatment activated sludge waste; hops residue; spent grain from brewing or distilling; a high protein waste or meal from an agricultural source of oil production, waste by-products and by-products from an oil seed pulp processing and a high protein animal excreta or a high protein animal meat processing by-product or waste and wherein the process comprises obtaining a pre-processed or "as is" high protein animal excreta or high protein animal meat processing by-product or waste which is non-auto-combustible, wherein the animal excreta has a protein content ranging from about 10% to about 60%, on a dry weight basis (DWB) and the animal meat processing by-product or waste has a protein content ranging from about 20% to about 85% dry weight basis.

21. The process defined in claim 1, wherein the process occurs in a traditional combustion chamber and wherein the high protein organic material is an additive to the combustion process.

22. The process defined in claim 1, wherein the protein content of the non-auto-combustible organic material ranges from about 20% to about 30% and the aggregate nitrogen oxide (NOX) production in the combustion chamber ranges from about 350 parts per million (ppm) to about 600 parts per million (ppm), wherein the protein content of the non-auto-combustible organic material ranges from about 30% to about 60% and the aggregate nitrogen oxide (NOX) production in the combustion chamber ranges from about 600 parts per million (ppm) to about 1,000 parts per million (ppm), or wherein the protein content of the non-auto-combustible organic material ranges from about 60% to about 80% and the aggregate nitrogen oxide (NOX) production in the combustion chamber ranges from about 1,000 parts per million (ppm) to about 1,400 parts per million (ppm).

* * * * *